United States Patent
Ware

(10) Patent No.: US 11,194,509 B2
(45) Date of Patent: *Dec. 7, 2021

(54) HIGH CAPACITY, HIGH PERFORMANCE MEMORY SYSTEM

(71) Applicant: Rambus Inc., Sunnyvale, CA (US)

(72) Inventor: Frederick Ware, Los Altos Hills, CA (US)

(73) Assignee: Rambus Inc., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/689,173

(22) Filed: Aug. 29, 2017

(65) Prior Publication Data

US 2018/0074758 A1   Mar. 15, 2018

Related U.S. Application Data

(63) Continuation of application No. 13/662,780, filed on Oct. 29, 2012, now Pat. No. 9,778,877.

(60) Provisional application No. 61/554,801, filed on Nov. 2, 2011.

(51) Int. Cl.
  *G06F 3/06* (2006.01)
  *G06F 12/06* (2006.01)
  *G06F 13/40* (2006.01)
  *G06F 13/16* (2006.01)
  *G06F 13/42* (2006.01)

(52) U.S. Cl.
  CPC ............ *G06F 3/0659* (2013.01); *G06F 12/06* (2013.01); *G06F 13/1689* (2013.01); *G06F 13/4086* (2013.01); *G06F 13/4256* (2013.01); *G06F 13/1684* (2013.01)

(58) Field of Classification Search
  CPC .... G06F 3/0659; G06F 12/06; G06F 13/1689; G06F 13/4086; G06F 13/1684; G06F 13/4256
  See application file for complete search history.

(56) References Cited

U.S. PATENT DOCUMENTS

| | | | |
|---|---|---|---|
| 4,245,301 | A | 1/1981 | Rokutanda et al. |
| 4,321,665 | A | 3/1982 | Shen et al. |
| 7,405,949 | B2 | 7/2008 | Lee et al. |

(Continued)

*Primary Examiner* — Eric Cardwell
(74) *Attorney, Agent, or Firm* — The Neudeck Law Firm LLC

(57) ABSTRACT

Memory devices and a memory controller that controls such memory devices. Multiple memory devices receive commands and addresses on a command/address (C/A) bus that is relayed point-to-point by each memory device. Data is received and sent from these devices to/from a memory controller in a point-to-point configuration by adjusting the width of each individual data bus coupled between the individual memory devices and the memory controller. Along with the C/A bus are clock signals that are regenerated by each memory device and relayed. The memory controller and memory devices may be packaged on a single substrate using package-on-package technology. Using package-on-package technology allows the relayed C/A signals to connect from memory device to memory device using wire bonding. Wirebond connections provide a short, high-performance signaling environment for the chip-to-chip relaying of the C/A signals and clocks from one memory device to the next in the daisy-chain.

20 Claims, 17 Drawing Sheets

(56) References Cited

U.S. PATENT DOCUMENTS

| | | |
|---|---|---|
| 7,768,297 B2 | 8/2010 | Wilson |
| 8,031,539 B2 | 10/2011 | Gregorius |
| 8,255,734 B2 | 8/2012 | Ware et al. |
| 2007/0061614 A1 | 3/2007 | Choi |
| 2007/0266201 A1* | 11/2007 | Estakhri ............... G06F 3/064 |
| | | 711/103 |
| 2008/0034130 A1 | 2/2008 | Perego et al. |
| 2008/0089138 A1* | 4/2008 | Wolford ........... G11C 11/40626 |
| | | 365/189.05 |
| 2010/0128539 A1 | 5/2010 | Kobayashi et al. |
| 2010/0321127 A1 | 12/2010 | Watanabe et al. |
| 2011/0033007 A1 | 2/2011 | Zerbe et al. |
| 2013/0086334 A1* | 4/2013 | Schuetz ............. G06F 13/1684 |
| | | 711/154 |
| 2013/0103917 A1* | 4/2013 | Gupta .................. G11C 7/109 |
| | | 711/167 |
| 2015/0143037 A1* | 5/2015 | Smith .................... G06F 3/061 |
| | | 711/103 |

* cited by examiner

HIGH CAPACITY, HIGH PERFORMANCE MEMORY SYSTEM

TECHNICAL FIELD

The present disclosure relates generally to information storage and retrieval and, more particularly, to communicating command and address information to a plurality of memory devices.

DETAILED DESCRIPTION

Various embodiments described herein relate to a system including integrated circuit devices, for example, memory devices and/or at least a memory controller device that controls such memory devices (and methods of operation of these respective devices). In several embodiments, as is described in more detail below, multiple memory devices receive commands and addresses on a command/address (C/A) bus that is relayed point-to-point by each memory device. Data is received and sent from these devices to/from a memory controller in a point-to-point configuration by adjusting the width of each individual data bus coupled between the individual memory devices and the memory controller. Along with the C/A bus are clock signals that are regenerated by each memory device and relayed.

The memory controller and memory devices may be packaged on a single substrate using package-on-package technology. Using package-on-package technology allows the relayed C/A signals to connect from memory device to memory device using wire bonding. Wirebond connections are relatively inexpensive to make and provide a short, high-performance signaling environment for the chip-to-chip relaying of the C/A signals and clocks from one memory device to the next in the daisy-chain.

Figure 1A:
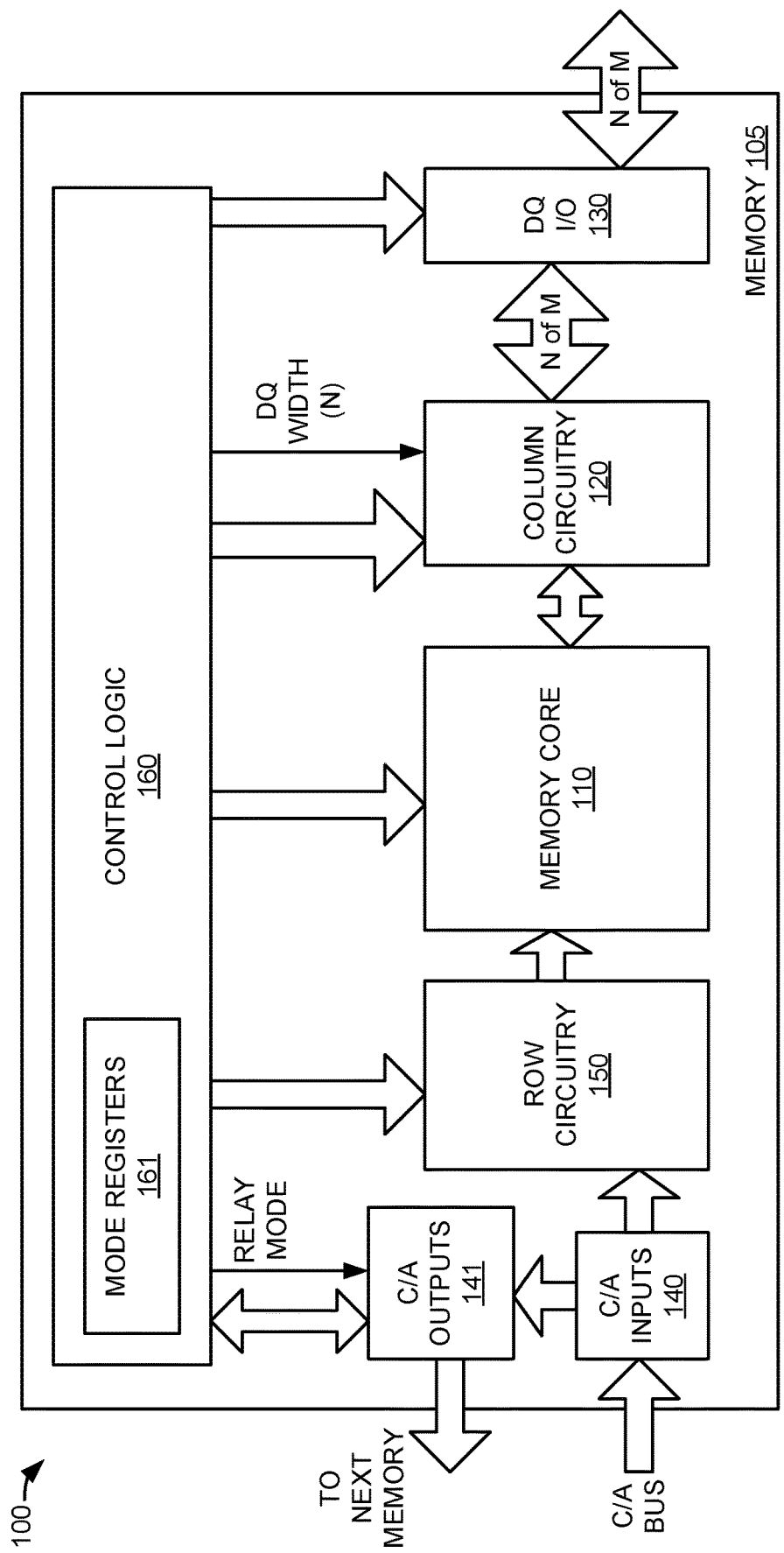
FIG. 1A is a block diagram illustrating a memory configuration.

FIG. 1A is a block diagram illustrating a memory configuration. In FIG. 1A, memory configuration 100 comprises memory 105. Memory 105 receives C/A signals (C/A bus). Memory 105 is configured by a settable mode to send C/A signals to a next memory device. Memory 105 may also be configured by a settable mode to not send C/A signals to a next memory device. In FIG. 1A, memory 105 sends and receives data (i.e., DQ I/O) signals. Memory 105 is capable of utilizing up to M number of DQ signals. Memory 105 is capable of being configured, using more settable modes, to use only N of the M DQ signals to communicate data. For example, if M=32, memory 105 is capable of being placed in a mode to use N=16 DQ signals to communicate, using a point-to-point topology, with a memory controller (not shown in FIG. 1A) that has 32 DQ I/O's. This allows another memory device (not shown in FIG. 1A) to also be configured to use 16 DQ signals and communicate, using a point-to-point topology, with the memory controller using the 16 DQ I/O's not used by memory 105. In another example, memory 105 is capable of being placed in a mode to use just N=8 DQ signals to communicate, using a point-to-point topology, with a memory controller (not shown in FIG. 1A) that has 32 DQ I/O's. This allows three additional memory devices (not shown in FIG. 1A) to also be configured to use 8 DQ signals and communicate, using a point-to-point topology, with the memory controller using the 24 DQ I/O's not used by memory 105 (8 DQ I/O's each for the three additional memory devices). It should be understood that other modes using other numbers of point-to-point DQ signals on each memory device are possible.

Memory 105 includes memory core 110, column circuitry 120, DQ I/O 130, C/A inputs 140, C/A outputs 141, row circuitry 150, and control logic 160. Control logic 160 may include mode registers 161. C/A inputs 140 may be operatively coupled to receive C/A signals from a memory controller or another memory (not shown in FIG. 1A). C/A outputs 141 may be operatively coupled to C/A inputs 140. C/A outputs 141 may be operatively coupled to control logic 160. Thus, C/A inputs 140 may be operatively coupled to control logic 160. In an embodiment, C/A inputs 140 may be operatively coupled to control logic 160 directly. That is, C/A inputs 140 may be operatively coupled to control logic 160 without being operatively coupled to C/A outputs 141.

C/A inputs 140 may be operatively coupled to row circuitry 150. Row circuitry 150 may be operatively coupled to memory core 110. Memory core 110 may be operatively coupled to column circuitry 120. Column circuitry 120 may be operatively coupled to DQ I/O 130. Row circuitry 150, memory core 110, column circuitry 120, and DQ I/O 130 may be operatively coupled to control logic 160. In other words, control logic 160 may, using values set and stored in mode registers 161, control and/or configure C/A inputs 140, C/A outputs 141, row circuitry 150, memory core 110, column circuitry 120, and DQ I/O 130.

In an embodiment, control logic 160 may, using values set and stored in mode registers 161, configure column circuitry 120 and/or DQ I/O 130 to operate using N of a possible M signals for communicating data to/from a memory controller. This is illustrated in FIG. 1A by a DQ Width indicator coupled between control logic 160 and column circuitry 120. Control logic 160 may, using values set and stored in mode registers 161, also configure C/A outputs 141 to relay (or not relay) commands and addresses received by C/A inputs 140 to another memory device. This forms a pointto-point "chain" of memories. FIG. 1A illustrates that these modes are settable by Relay Mode indicator coupled between control logic 160 and C/A outputs 141. It should further be noted that in order to instruct only a single one of the memories in a point-to-point chain, a method of individually addressing commands to individual memories may be configured by values set and stored in mode registers 161. Individual commands may be addressed to individual memories in these modes by encoding chip select signals into a command. In an embodiment, in order to reduce the number of signal lines dedicated to addressing a particular memory in the point-to-point chain, the aforementioned chip select mode(s) may rely on chip select signals that are encoded in a plurality of bits as opposed to using an unencoded "one-hot" chip select scheme.

Figure 1B:
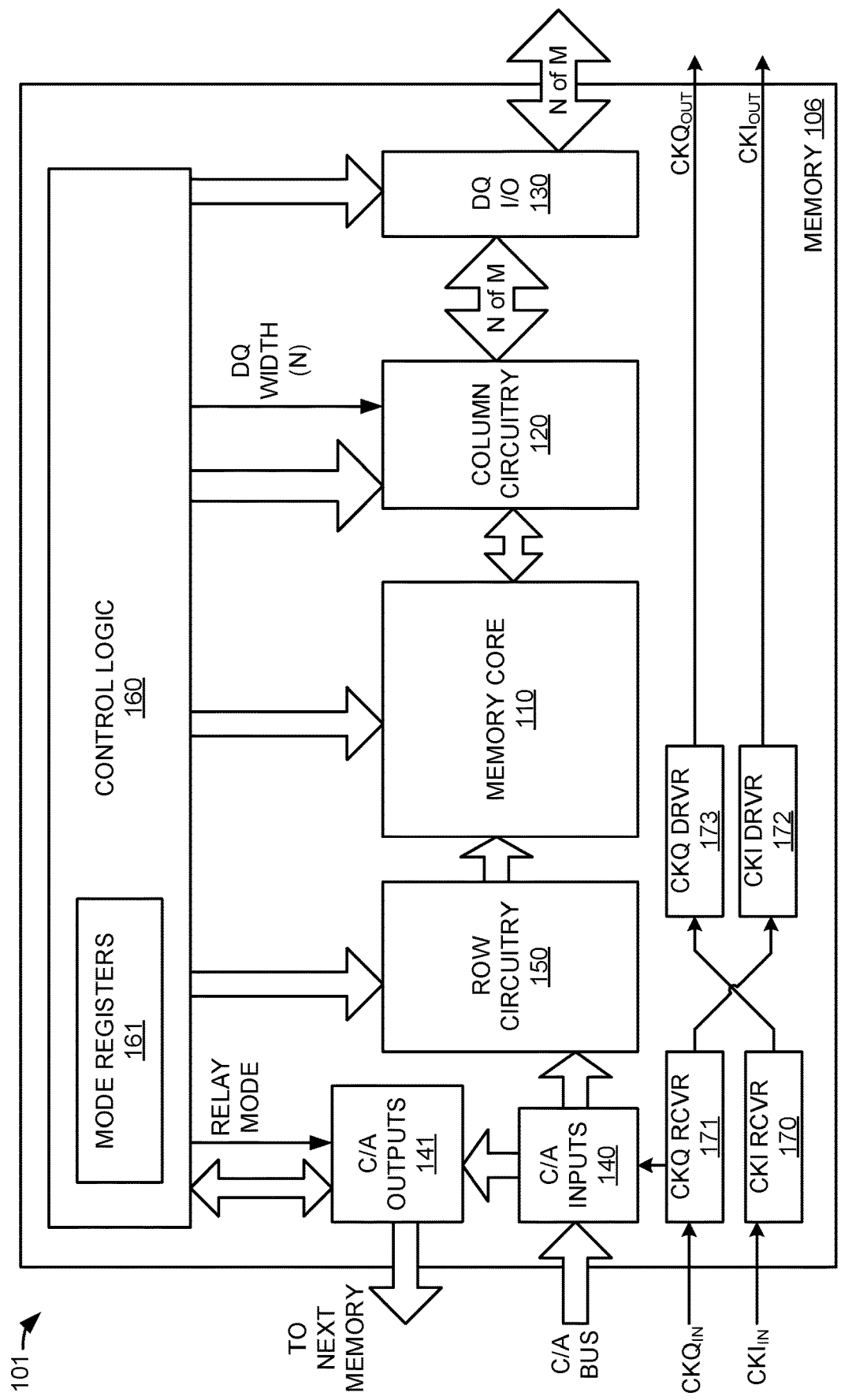
FIG. 1B is a block diagram illustrating a memory configuration.

FIG. 1B is a block diagram illustrating a memory configuration. In FIG. 1B, memory configuration 101 comprises memory 106. Memory 106 includes the same elements as memory 105 of memory core 110, column circuitry 120, DQ I/O 130, C/A inputs 140, C/A outputs 141, row circuitry 150, and control logic 160. Thus, for the sake of brevity, discussion of these elements and their functions will not be repeated here.

Memory 106 also includes clock receiver and driver circuits including CKI receiver 170, CKQ receiver 171, CKI driver 172 and CKQ driver 173. CKI receiver 170 is configured to receive a first timing reference signal $CKI_{IN}$. CKQ receiver 171 is configured to receive a second timing reference signal $CKQ_{IN}$. CKQ receiver 171 is operatively coupled to C/A inputs 140. Thus, C/A inputs 140 may use a received timing reference signal $CKQ_{IN}$ to resolve the signal values on the C/A bus synchronously with respect to the timing reference signal $CKQ_{IN}$. It should also be understood that since C/A inputs 140 may be operatively coupled to C/A outputs 141, the timing reference signal $CKQ_{IN}$ may be used as a timing reference for the C/A outputs 141 to drive the C/A signal values received by C/A inputs 140 to another memory.

CKI receiver 170 is operatively coupled to CKQ driver 173. Based on a signal received from CKI receiver 170, CKQ driver 173 generates an output timing reference signal $CKQ_{OUT}$. CKQ receiver 171 is operatively coupled to CKI driver 172. Based on a signal received from CKQ receiver 171, CKI driver 172 generates an output timing reference signal $CKI_{OUT}$. $CKI_{OUT}$ and $CKQ_{OUT}$ may be used as timing reference signals by a next memory device. In other words, one or both of $CKI_{OUT}$ and $CKQ_{OUT}$ may be used by a next memory device as the $CKI_{IN}$ and $CKQ_{IN}$ received by that next memory device. Thus, one or both of $CKI_{OUT}$ and $CKQ_{OUT}$ sent by memory device 106 may function as timing reference signals used by the next memory device to resolve the C/A signals received from memory device 106.

In a specific embodiment, the at least two input timing reference signals $CKI_{IN}$ and $CKQ_{IN}$, and the at least two output timing reference signals $CKI_{OUT}$ and $CKQ_{OUT}$ are provided, in a system, to one or more memory devices. The timing reference signals $CKI_{IN}$ and $CKQ_{IN}$ are the same frequency, but $CKQ_{IN}$ is delayed from the other by approximately ¼ of a cycle. Thus, the two timing reference signals $CKI_{IN}$ and $CKQ_{IN}$ have a quadrature phase relationship or are "in quadrature." Likewise, the timing reference signals $CKI_{OUT}$ and $CKQ_{OUT}$ are the same frequency, but $CKQ_{OUT}$ is delayed from the other by approximately ¼ of a cycle. Thus, the two timing reference signals $CKI_{OUT}$ and $CKQ_{OUT}$ have a quadrature phase relationship.

Figure 2:
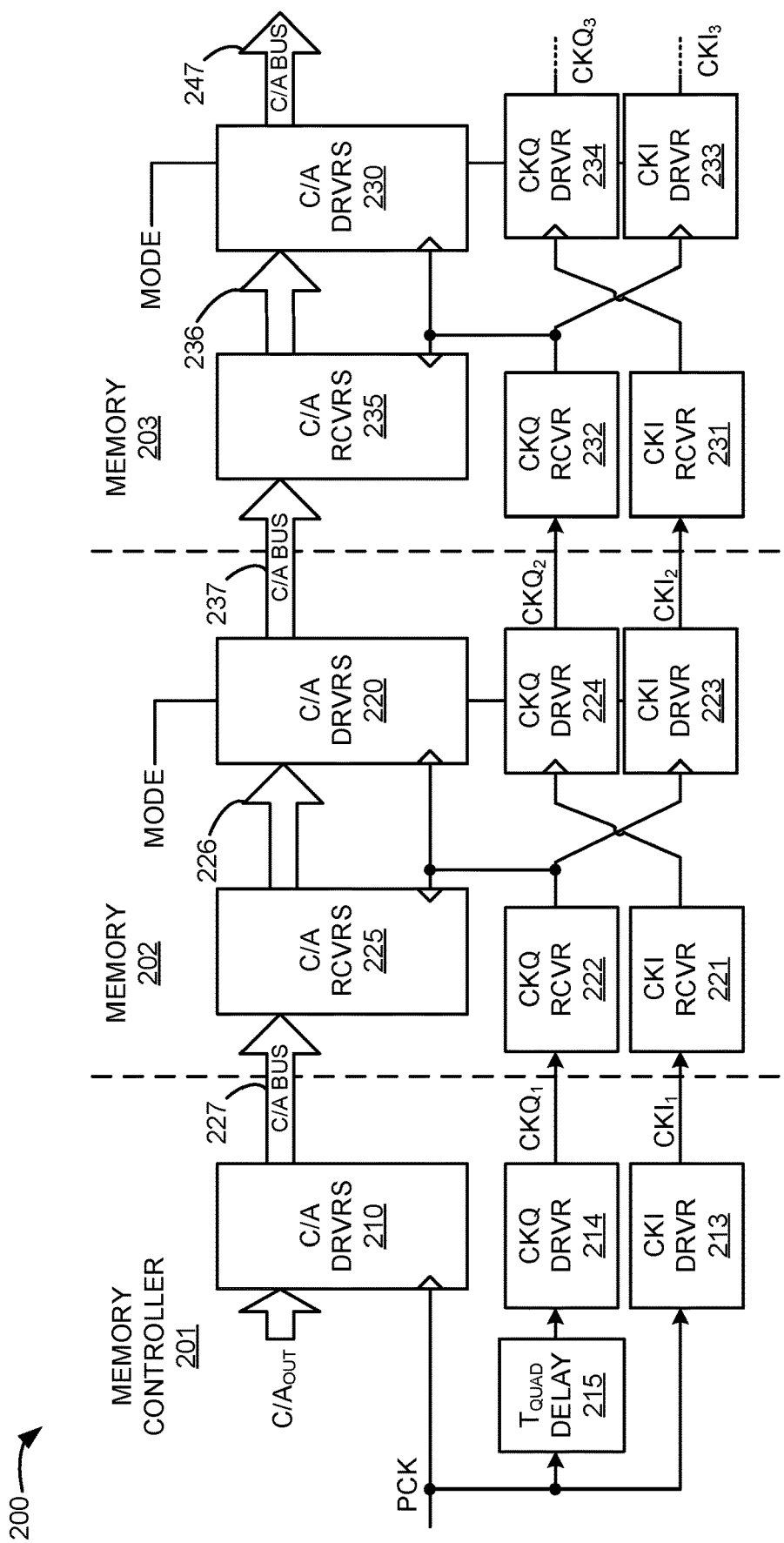
FIG. 2 is a block diagram illustrating a memory system.

FIG. 2 is a block diagram illustrating a memory system. In FIG. 2, memory system 200 comprises a memory controller 201 and a plurality of memories such as memory 202 and memory 203. Memory controller 201 comprises C/A drivers 210, CKI driver 213, CKQ driver 214, and $T_{QUAD}$ delay 215. Memory 202 comprises C/A receivers 225, C/A drivers 220, CKI receiver 221, CKQ receiver 222, CKI driver 223, and CKQ driver 224. Memory 203 comprises C/A receivers 235, C/A drivers 230, CKI receiver 231, CKQ receiver 232, CKI driver 233, and CKQ driver 234.

C/A drivers 210, $T_{QUAD}$ delay 215, and CKI driver 213 are operatively coupled to receive internal timing reference signal PCK. C/A drivers 210 is operatively coupled to receive internal command/address signals $C/A_{OUT}$. Internal $C/A_{OUT}$ signals are driven from the memory controller 201 to C/A receivers 225 of memory 202 via C/A bus 227. CKQ driver 214 is operatively coupled to receive a delayed version of PCK from $T_{QUAD}$ delay 215. CKI driver 213 is operatively coupled to receive PCK. CKQ driver 214 is operatively coupled to send $CKQ_1$ to CKQ receiver 222 of memory 202. CKI driver 213 is operatively coupled to send $CKI_1$ to CKI receiver 221 of memory 202. Because CKQ driver 214 receives a version of PCK that is delayed by $T_{QUAD}$ delay 215 by approximately ¼ of a cycle (a.k.a., a quadrature phase delay), $CKI_1$ and $CKQ_1$ (and thus the timing reference signals received by CKI receiver 221 and CKQ receiver 222, respectively) have an approximate quadrature phase relationship.

C/A receivers 225 are operatively coupled to C/A drivers 220 by internal bus 226. Internal bus 226 carries signal values received by C/A receivers 225. C/A drivers 220 are operatively coupled to an internal mode signal that determines whether C/A drivers 220 are to send the signal values received by C/A receivers 225 to C/A receivers 235 of memory 203.

In memory 202, C/A receivers 225, C/A drivers 220, and CKI driver 223 are operatively coupled to receive a timing reference signal from CKQ receiver 222. The timing reference signal C/A receivers 225, C/A drivers 220, and CKI driver 223 receive from CKQ receiver 222 is based on $CKQ_1$. In other words, CKQ receiver 222 receives $CKQ_1$ and clocks C/A receivers 225, C/A drivers 220, and CKI driver 223. CKQ driver 224 is operatively coupled to receive a timing reference signal from CKI receiver 221. The timing reference signal CKQ driver 224 receives from CKI receiver 221 is based on $CKI_1$. In other words, CKI receiver 221 receives $CKI_1$ and clocks CKQ driver 224.

C/A drivers 220 are operatively couple to receive command/address signal values from C/A receivers 225. The C/A signal values on internal bus 226 are driven from the memory 202 to C/A receivers 235 of memory 203 via C/A bus 237. CKQ driver 224 is operatively coupled to receive a version of $CKI_1$ from CKI receiver 221. CKI driver 223 is operatively coupled to receive a version of $CKQ_1$ from CKQ receiver 222. CKQ driver 224 is operatively coupled to send $CKQ_2$ to CKQ receiver 232 of memory 203. CKI driver 223 is operatively coupled to send $CKI_2$ to CKI receiver 231 of memory 203. In an embodiment, CKI driver 223 outputs a version of $CKQ_1$ that is inverted from the $CKQ_1$ received by CKQ receiver 222. Because CKI receiver 221 receives $CKI_1$ which leads $CKQ_1$ by approximately ¼ of a cycle, and these signals are sent to CKQ driver 224 and CKI driver 223, respectively, and CKI driver 223 outputs an inverted version of the received $CKQ_1$, $CKI_2$ and $CKQ_2$ (and thus the timing reference signals received by CKI receiver 231 and CKQ receiver 232) have an approximate quadrature phase relationship where $CKQ_2$ lags $CKI_2$ by approximately ¼ of a cycle.

In memory 203, C/A receivers 235 are operatively coupled to C/A drivers 230 by internal bus 236. Internal bus 236 carries signal values received by C/A receivers 235. C/A drivers 230 are operatively coupled to an internal mode signal that determines whether C/A drivers 230 are to send the signal values received by C/A receivers 235 to another memory (not shown in FIG. 2) via C/A bus 247.

C/A receivers 235, C/A drivers 230, and CKI driver 233 are operatively coupled to receive a timing reference signal from CKQ receiver 232. CKQ driver 234 is operatively coupled to receive a timing reference signal from CKI receiver 231. C/A drivers 230 are operatively coupled to receive command/address signal values from C/A receivers 235. The C/A signal values on internal bus 236 are driven from the memory 203 to C/A receivers of another memory (not shown in FIG. 2). CKQ driver 234 is operatively coupled to receive a version of $CKI_2$ from CKI receiver 231. CKI driver 233 is operatively coupled to receive a version of $CKQ_2$ from CKQ receiver 232. CKQ driver 234 is operatively coupled to send a timing reference signal ($CKQ_3$) based on $CKI_2$ to a CKQ receiver of another memory. CKI driver 233 is operatively coupled to send a timing reference ($CKI_3$) signal based on $CKQ_2$ to a CKI receiver of another memory. In an embodiment, CKI driver 233 outputs a version of $CKQ_2$ that is inverted from the $CKQ_2$ received by CKQ receiver 232. Because CKI receiver 231 receives $CKI_2$ which leads $CKQ_2$ by approximately ¼ of a cycle, and these signals are sent to CKQ driver 234 and CKI driver 233, respectively, and CKI driver 233 outputs an inverted version of the received $CKQ_2$, the timing reference signals sent by memory 203 have an approximate quadrature phase relationship with $CKQ_3$ lagging $CKI_3$ by approximately ¼ of a cycle.

Figure 3:
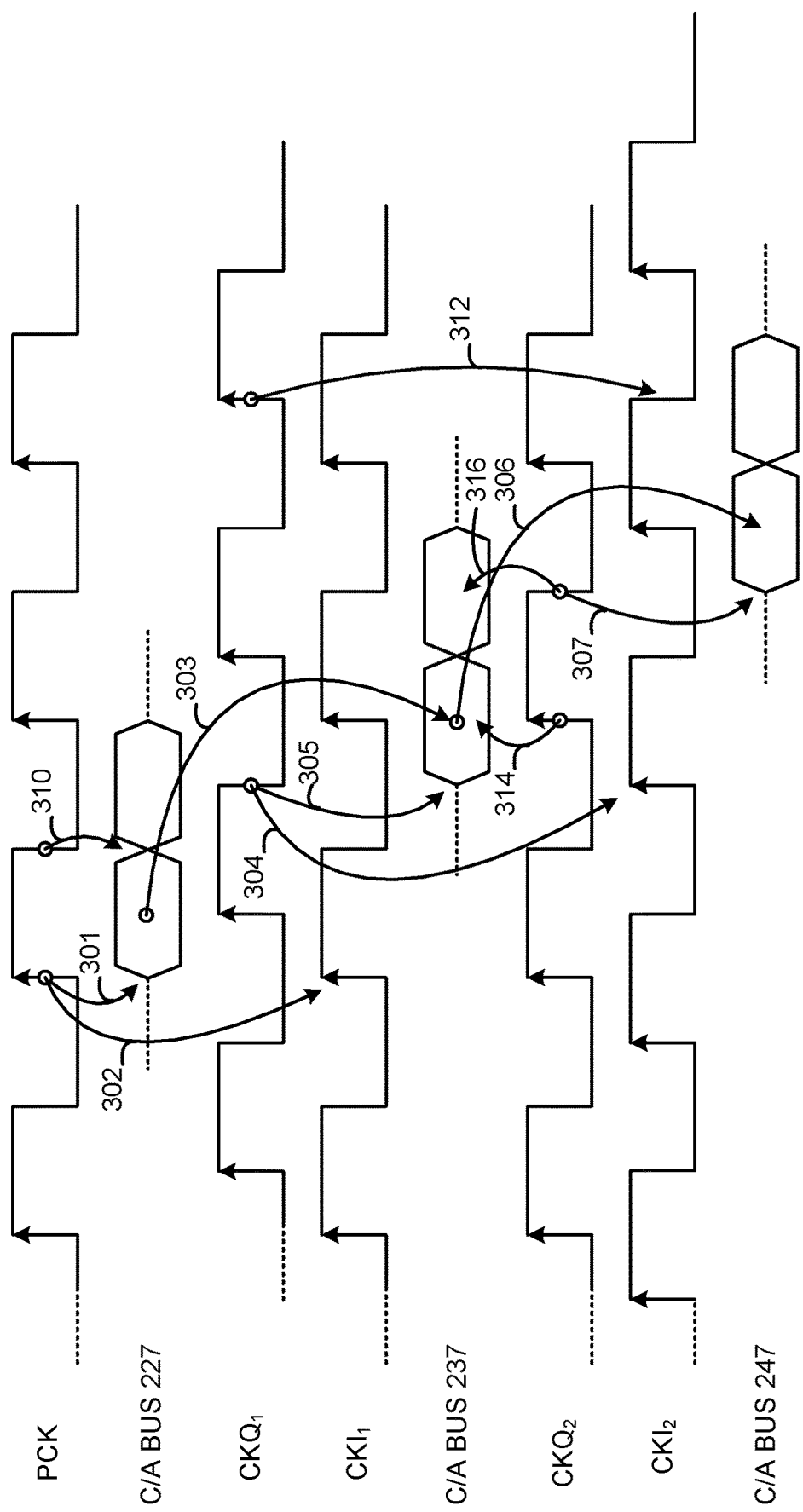
FIG. 3 is a timing diagram illustrating the transmission of command/address information.

FIG. 3 is a timing diagram illustrating the transmission of command/address information. The signals and timing illustrated in FIG. 3 may correspond to signals and timing of memory system 200 (illustrated in FIG. 2). In particular, the signals and timing illustrated in FIG. 3 may correspond to the signals and timing of the elements of memory system 200. In FIG. 3, and the rest of this specification, CKI, CKQ, and other signals are shown as single ended signals. This is done merely for clarity of presentation. It should be understood that in all of the Figures, embodiments, and discussions, CKI, CKQ, or any other signals (e.g., $CKQ_1$, CA[0: P−1], DQ[0:M−1], etc.) may encompass both single-ended signals carried on a single line, and complementary or differential signals carried on two lines. In other words, for example, the line connecting CKQ driver 214 from memory controller 201 to memory 202 in FIG. 2 should be understood to represent one single-ended signal carried on a single signal line, or alternatively two complementary or differential signals, carried on two signal lines, but representing one value. Likewise, the $CKQ_1$ waveform illustrated in FIG. 3, for example, should be understood to convey the state of one single-ended signal, or alternatively the state of a complementary or differential signal.

In FIG. 3, PCK is shown periodically cycling. The second rising edge of PCK in FIG. 3 is shown corresponding to roughly a transition of signals on C/A Bus 227. Thus, as shown in FIG. 2, PCK is the timing reference used to cause the transition of signals output on C/A bus 227. This relationship is illustrated in FIG. 3 by arrow 301 indicating the transition of C/A bus 227 in response to the rising edge of PCK. Also in response to the rising edge of PCK, there is a rising edge on $CKI_1$. This is illustrated by arrow 302. In an embodiment, C/A bus 227 operates at double data rate. That is, new data is sent/received every phase of PCK. Thus, the falling edge of PCK causes a transition of signals output on C/A bus 227. This relationship is illustrated in FIG. 3 by arrow 310 indicating the transition of C/A bus 227 in response to the falling edge of PCK.

$CKQ_1$ is shown cycling at the same frequency as $CKI_1$. $CKQ_1$ is shown delayed from $CKI_1$ by approximately ¼ of a cycle. This delay is a result of $T_{QUAD}$ delay 215. This delay may also be known as a 90° phase shift. Thus, the delay of approximately ¼ of a cycle causes the rising edge of $CKQ_1$ to occur approximately when a stable signal eye of the signals on C/A bus 227 are occurring. The rising edge and falling edge of $CKQ_1$ may be used to sample (or resolve) the C/A bus 227 signal values at the pins of memory 202. In another embodiment, an immediately preceding rising edge of $CKI_1$ and the next falling edge of $CKI_1$ may be used to define a time interval over which the C/A bus 227 signals at the pins of memory 202 are integrated to resolve the C/A bus 227 signal values.

The C/A bus 227 signal values resolved by memory 202 are driven on C/A bus 237 by memory 202. This is illustrated by arrow 303. The second falling edge of $CKQ_1$ in FIG. 3 is shown corresponding to roughly a transition of signals on C/A Bus 237. Thus, as shown in FIG. 2, $CKQ_1$ is the basis for a timing reference used to cause the transition of signals output on C/A bus 237. This relationship is illustrated in FIG. 3 by arrow 305 indicating the transition of C/A bus 237 in response to the falling edge of $CKQ_1$. Also in response to the falling edge of $CKQ_1$, there is a rising edge on $CKI_2$. This is illustrated by arrow 304. Likewise, as illustrated by arrow 312, in response to a rising edge of $CKQ_1$, there is a falling edge of $CKI_2$. In an embodiment, C/A bus 237 operates at double data rate. That is, new data is sent/received every phase of $CKQ_1$. Thus, the rising edge of $CKQ_1$ causes a transition of signals output on C/A bus 237. It should also be understood that due to the relationship between $CKI_1$, $CKQ_1$, and $CKI_2$, $CKQ_2$ (which are received by memory 203), $CKQ_2$ has edges that lie approximately in the middle of the data eye of C/A bus 237. This is illustrated in FIG. 3 by arrows 314 and 316. Thus, the edges of $CKQ_2$ may be used as a timing reference to resolve the double data rate signal values on C/A bus 237 without additional delay and/or calibration circuitry on memory 202 or memory 203 to align $CKQ_2$ (or $CKI_2$). This relationship also allows $CKQ_1$ to be inverted to generate $CKI_2$ without additional delay and/or calibration circuitry on memory 202.

The C/A bus 237 signal values resolved by memory 203 are driven on C/A bus 247 by memory 203. This is illustrated by arrow 306. The third falling edge of $CKQ_2$ in FIG. 3 is shown corresponding to roughly a transition of signals on C/A Bus 247. Thus, as shown in FIG. 2, $CKQ_2$ is the basis for a timing reference used to cause the transition of signals output on C/A bus 247. This relationship is illustrated in FIG. 3 by arrow 307 indicating the transition of C/A bus 247 in response to the falling edge of $CKQ_2$. It should also be understood that due to the relationship between $CKI_2$, $CKQ_2$, and $CKI_3$, $CKQ_3$ (which is received by the next memory) has edges that lie approximately in the middle of the data eye of C/A bus 247. Thus, the edges of $CKQ_3$ may be used as a timing reference to resolve the double data rate signal values on C/A bus 247 without additional delay and/or calibration circuitry on memory 203, or the next memory, to align $CKQ_3$ (or $CKI_3$). This relationship also allows $CKQ_2$ to be inverted to generate $CKI_3$ without additional delay and/or calibration circuitry on memory 203.

It should be noted that the time lapse from when new signal values are driven on a C/A bus (i.e., C/A bus 227, C/A bus 237, C/A bus 247, etc.) until those same values are driven on the next C/A bus (i.e., new values driven on C/A bus 227 until they are relayed on C/A bus 237; new values driven on C/A bus 237 until they are relayed on C/A bus 247, etc.) is three-fourths (¾) of a cycle of PCK, $CKQ_1$, $CKQ_1$, $CKI_2$, etc.

Figure 4:
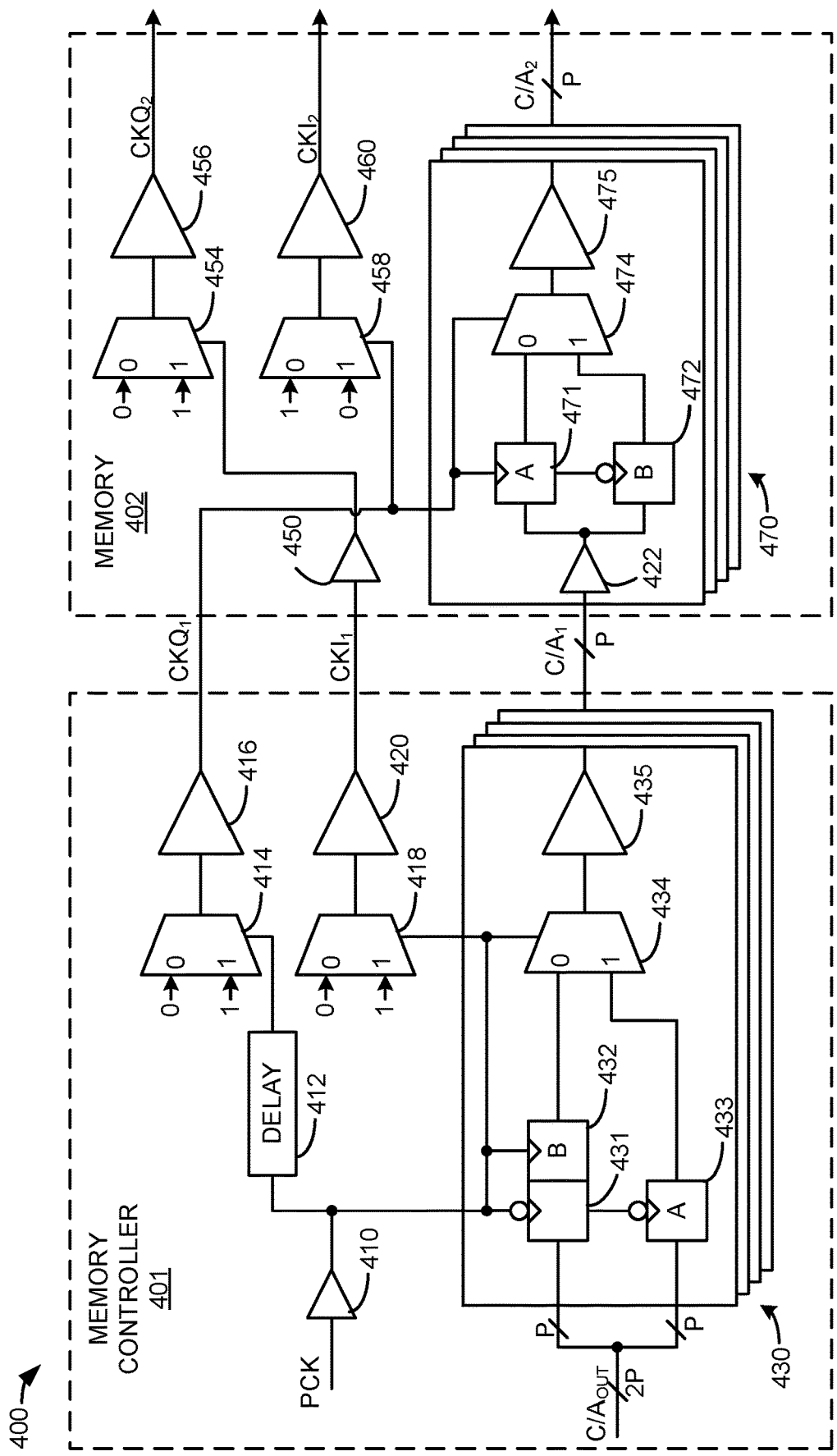
FIG. 4 is a schematic diagram illustrating a system for transmitting clocks and command/address information and timing references.

FIG. 4 is a schematic diagram illustrating a system for transmitting command/address information and timing references. In FIG. 4, memory system 400 comprises memory controller 401 and memory 402. Additional memories (not shown in FIG. 4) may also be included in memory system 400.

Memory controller 401 comprises buffer 410, delay 412, multiplexer (MUX) 414, driver 416, MUX 418, driver 420, and bitslices 430. MUX 414 and MUX 418 are 2:1 multiplexers. The output of delay 412 is its input (PCK) delayed by approximately ¼ of a cycle. Each of bitslices 430 comprises latch 431, latch 432, latch 433, MUX 434, and driver 435. MUX 434 is a 2:1 multiplexer. Latch 431 and latch 433 are illustrated as latches that latch on a low state (or low transitioning) of their respective clock input. Latch 432 is illustrated as a latch that latches on a high state (or high transitioning) of its clock input. The output of latch 431 is coupled to the input of latch 432. Thus, latch 432 outputs the data latched by latch 431 during the low state (or low transition) of latch 431's clock input one phase later during the high state (or high transition) of latch 432's clock input.

Signal PCK is coupled to the input of buffer 410. The output of buffer 410 is coupled to an input of delay 412, and the select input of MUX 418. The output of buffer 410 is also coupled to each of bitslices 430. In each of bitslices 430, the output of buffer 410 is coupled to the clock input of latch 432, the clock input of latch 432, the clock input of latch 433, and the select input of MUX 434.

The output of delay 412 is coupled to the select input of MUX 414. The "0" data input of MUX 414 is connected to a constant logic low ("0"). The "1" data input of MUX 414 is connected to a constant logic high ("1"). The output of MUX 414 is coupled to the input of driver 416. The output of driver 416 is the signal $CKQ_1$. $CKQ_1$ is driven to memory 402.

The "0" data input of MUX 418 is connected to a constant logic low ("0"). The "1" data input of MUX 418 is connected to a constant logic high ("1"). The output of MUX 418 is coupled to the input of driver 420. The output of driver 420 is the signal $CKI_1$. $CKI_1$ is driven to memory 402.

In each of bitslices 430, the data input of latch 432 and the data input of latch 433 are coupled to one of the P number of $C/A_{OUT}$ signals. The output of latch 433 is coupled to the "1" data input of MUX 434. The output of latch 432 is coupled to the "0" data input of MUX 434. The output of MUX 434 is coupled to the input of driver 435. The output of driver 435 is one of P $C/A_1$ signals that are driven to memory 402.

Memory 402 includes buffer 450, MUX 454, driver 456, MUX 458, driver 460, and bitslices 470. MUX 454 and MUX 458 are 2:1 multiplexers. Each of bitslices 470 comprises buffer 422, latch 471, latch 472, MUX 474, and driver 475. Latch 471 is illustrated as a latch that latches on a high state (or high transitioning) of its clock input. Latch 472 is illustrated as a latch that latches on a low state (or low transitioning) of its clock input.

In each of bitslices 470, the input of buffer 422 is coupled to one of the P number of $C/A_1$ signals. The output of buffer 422 is coupled to the data input of latch 471 and the data input of latch 472. The output of latch 472 is coupled to the "1" data input of MUX 474. The output of latch 471 is coupled to the "0" data input of MUX 474. The output of MUX 474 is coupled to the input of driver 475. The output of driver 475 is one of P $C/A_2$ signals that are driven to another memory (not shown in FIG. 4).

The input of buffer 450 is coupled to signal $CKI_1$ received from memory controller 401. The output of buffer 450 is coupled to the select input of MUX 454. The signal $CKQ_1$ received from memory controller 401 is coupled to the select input of MUX 458. In each of bitslices 470, signal $CKQ_1$ received from memory controller 401 is coupled to the clock input of latch 471, the clock input of latch 472, and the select input of MUX 474.

The "0" data input of MUX 454 is connected to a constant logic low ("0"). The "1" data input of MUX 454 is connected to a constant logic high ("1"). The output of MUX 454 is coupled to the input of driver 456. The output of driver 456 is the signal $CKQ_2$. $CKQ_2$ is driven to another memory (not shown in FIG. 4).

The "0" data input of MUX 458 is connected to a constant logic high ("1"). The "1" data input of MUX 458 is connected to a constant logic low ("0"). The output of MUX 458 is coupled to the input of driver 460. The output of driver 460 is the signal $CKI_2$. $CKI_2$ is driven to another memory (not shown in FIG. 4). Note that by connecting the "0" data input of MUX 458 to a constant logic high ("1") and the "1" data input of MUX 458 to a constant logic low ("0") the output of MUX 458 (and thus the output of driver 460—$CKI_2$) is inverted from the $CKQ_1$ signal that drives the select input of MUX 458. In other words, when $CKQ_1$ is a logic high ("1"), MUX 458 outputs a logic low ("0"). When $CKQ_1$ is a logic low ("0"), MUX 458 outputs a logic high ("1").

Figure 5:
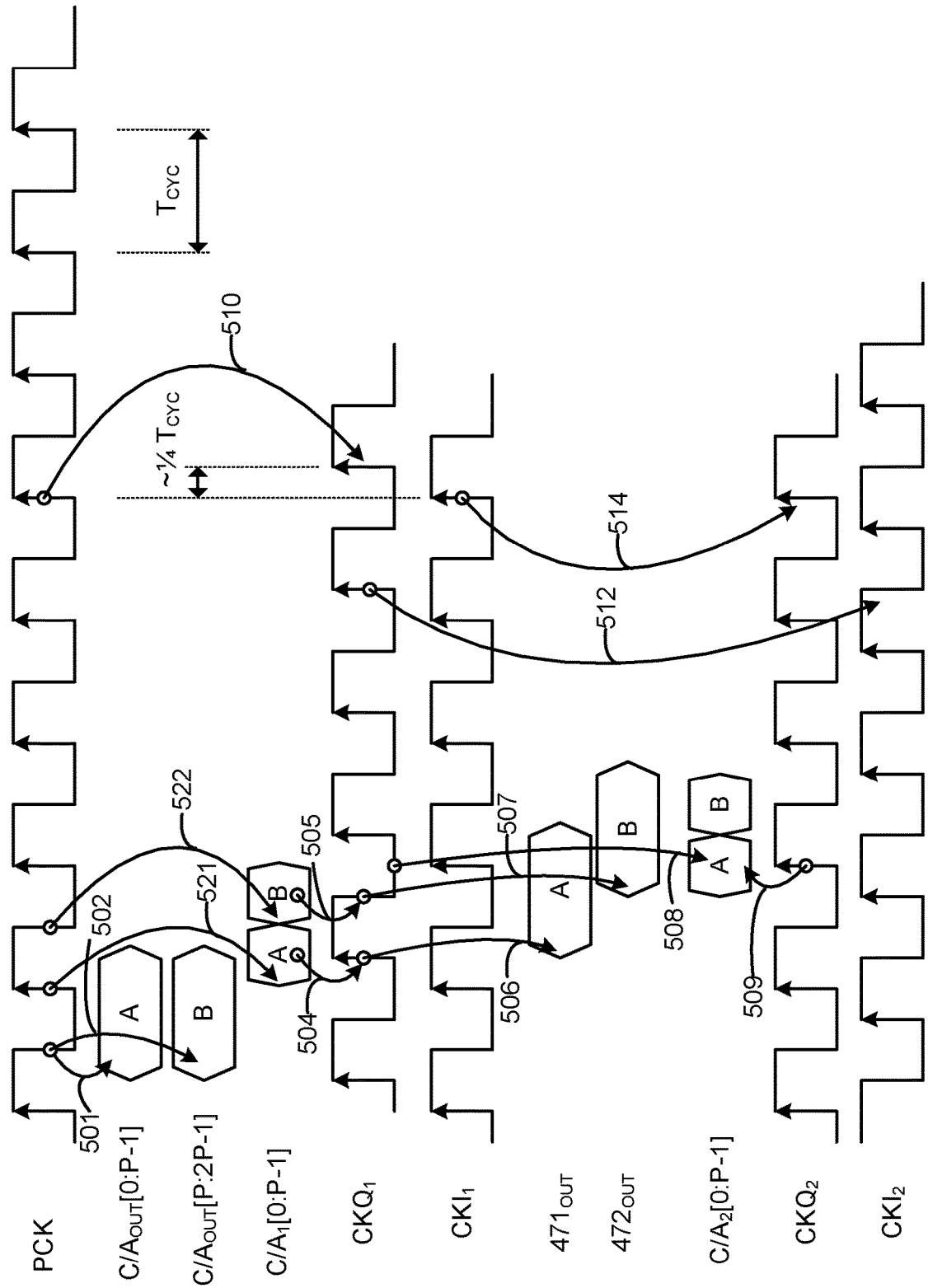
FIG. 5 is a timing diagram illustrating the transmission of clocks and command/address information.

FIG. 5 is a timing diagram illustrating the transmission of clocks and command/address information. The operation of memory system 400 may be better understood with reference to FIG. 5. In FIG. 5, signal PCK periodically switches between logic low and logic high states with a period of $T_{CYC}$ and a duty cycle of approximately 50%. Signals $C/A_{OUT}[0:2P-1]$ are data inputs to bitslices 430 (two signals per bitslice, respectively). Signals $C/A_{OUT}[0:2P-1]$ are input to bitslices 430 so that new data is input to bitslices 430 every cycle of PCK. Thus, on the falling edge of PCK, bitslices 430 sample 2P bits of $C/A_{OUT}[0:2P-1]$ data consisting of P bits of "A" data ($C/A_{OUT}[0:P-1]$) and P bits of "B" data" $C/A_{OUT}[P:2P-1]$. The "A" data ($C/A_{OUT}[0:P-1]$) is sampled into latch 433 of bitslices 430. The "B" data $C/A_{OUT}[P:2P-1]$ is sampled into latch 431 of bitslices 430. The "B" data is then transferred to latch 432 on the rising edge of PCK. The "A" data ($C/A_{OUT}[0:P-1]$) is shown in FIG. 5 as "A". The "B" data ($C/A_{OUT}[P:2P-1]$) is shown in FIG. 5 as "B". The sampling of the "A" and "B" data on the falling edge of PCK is illustrated in FIG. 5 by arrows 501 and 502, respectively.

The rising edge of PCK causes MUX 434 to switch from selecting the output of latch 432 to selecting the output of latch 433 to be relayed to driver 435. This causes the drivers 435 of bitslices 430 to output the "A" data on $C/A_1[0:P-1]$ while PCK is high. This is illustrated in FIG. 5 by arrow 521. The falling edge of PCK causes MUX 434 to switch from selecting the output of latch 433 to selecting the output of latch 432 to be relayed to driver 435. This causes the drivers 435 of bitslices 430 to output the "B" data on $C/A_1[0:P-1]$ while PCK is low. This is illustrated in FIG. 5 by arrow 522.

As PCK toggles, it is delayed by approximately ¼ of a cycle (i.e., ¼ $T_{CYC}$) by delay 412. The output of delay 412 causes MUX 414 to alternately select a logic "1" and a logic "0" to be input to driver 416. This causes $CKQ_1$ to toggle at a period of $T_{CYC}$, but delayed by approximately ¼ of a cycle from PCK. The delayed by approximately ¼ cycle relationship between PCK and $CKQ_1$ is pointed out by arrow 510. PCK causes MUX 418 to alternately select a logic "1" and a logic "0" to be input to driver 420. This causes $CKI_1$ to toggle at a period of $T_{CYC}$, approximately in phase with PCK. Accordingly, $CKI_1$ and $CKQ_1$ cycle at the same period, but $CKI_1$ leads $CKQ_1$ by approximately ¼ of a cycle. Thus, as described previously, $CKI_1$ and $CKQ_1$ may be referred to as "quadrature clocks" or "in quadrature".

Signals $C/A_1[0:P-1]$ are data inputs to bitslices 470 (one signal per bitslice, respectively). Signals $C/A_1[0:P-1]$ are input to bitslices 470 so that new data is input to bitslices 470 every ½ cycle of $CKI_1$. Bitslices 470 sample a first set of $C/A_1[0:P-1]$ data (i.e., the "A" data) on the rising edge of $CKQ_1$, and a second set of $C/A_1[0:P-1]$ data on the falling edge of $CKQ_1$ (i.e., the "B" data). The "A" $C/A_1[0:P-1]$ data is sampled into latch 471 of bitslices 470. The "B" $C/A_1[0:P-1]$ data is sampled into latch 472 of bitslices 430. The sampling of the "A" and "B" data on the rising edge and falling edge of $CKQ_1$ is illustrated in FIG. 5 by arrows 506 and 507, respectively.

The falling edge of $CKQ_1$ causes MUX 474 to switch from selecting the output of latch 472 to selecting the output of latch 471 to be relayed to driver 475. This causes the drivers 475 of bitslices 470 to output the "A" data on $C/A_2[0:P-1]$. This is illustrated in FIG. 5 by arrow 508.

The toggling of $CKI_1$ causes MUX 454 to alternately select a logic "1" and a logic "0" to be input to driver 456. This causes $CKQ_2$ to toggle at a period of $T_{CYC}$, approximately in phase with $CKI_1$. $CKQ_1$ causes MUX 458 to alternately select a logic "1" and a logic "0" to be input to driver 460. This causes $CKI_1$ to toggle at a period of $T_{CYC}$. However, because of the inversion caused by having the "0" data input of MUX 458 connected to a logic high ("1"), and the "1" data input of MUX 458 connected to a logic low ("0"), $CKI_2$ leads $CKQ_2$ by approximately ¼ of a cycle. Thus, $CKI_2$ and $CKQ_2$ cycle at the same period, but $CKI_2$ leads $CKQ_2$ by approximately ¼ of a cycle. The relationship of $CKQ_1$ causing $CKI_2$ to toggle approximately 180° out of phase with $CKQ_1$ (i.e., since $CKQ_1$ and $CKI_2$ have approximately 50% duty cycles, $CKI_2$ is inverted with respect to $CKQ_1$) is pointed out by arrow 512. The relationship of $CKI_1$ causing $CKQ_2$ to toggle approximately in phase with $CKI_1$ is pointed out by arrow 514. It should also be understood that these timing relationships result in the rising edge of $CKQ_2$ occurring approximately in the center of the "A" data on $C/A_2[0:P-1]$. This allows the rising edge of $CKQ_2$ to be used to sample the "A" data on $C/A_2[0:P-1]$ and the falling edge of $CKQ_2$ to be used to sample the "B" data on $C/A_2[0:P-1]$. This is illustrated in FIG. 5 by arrow 509.

Figure 6A:
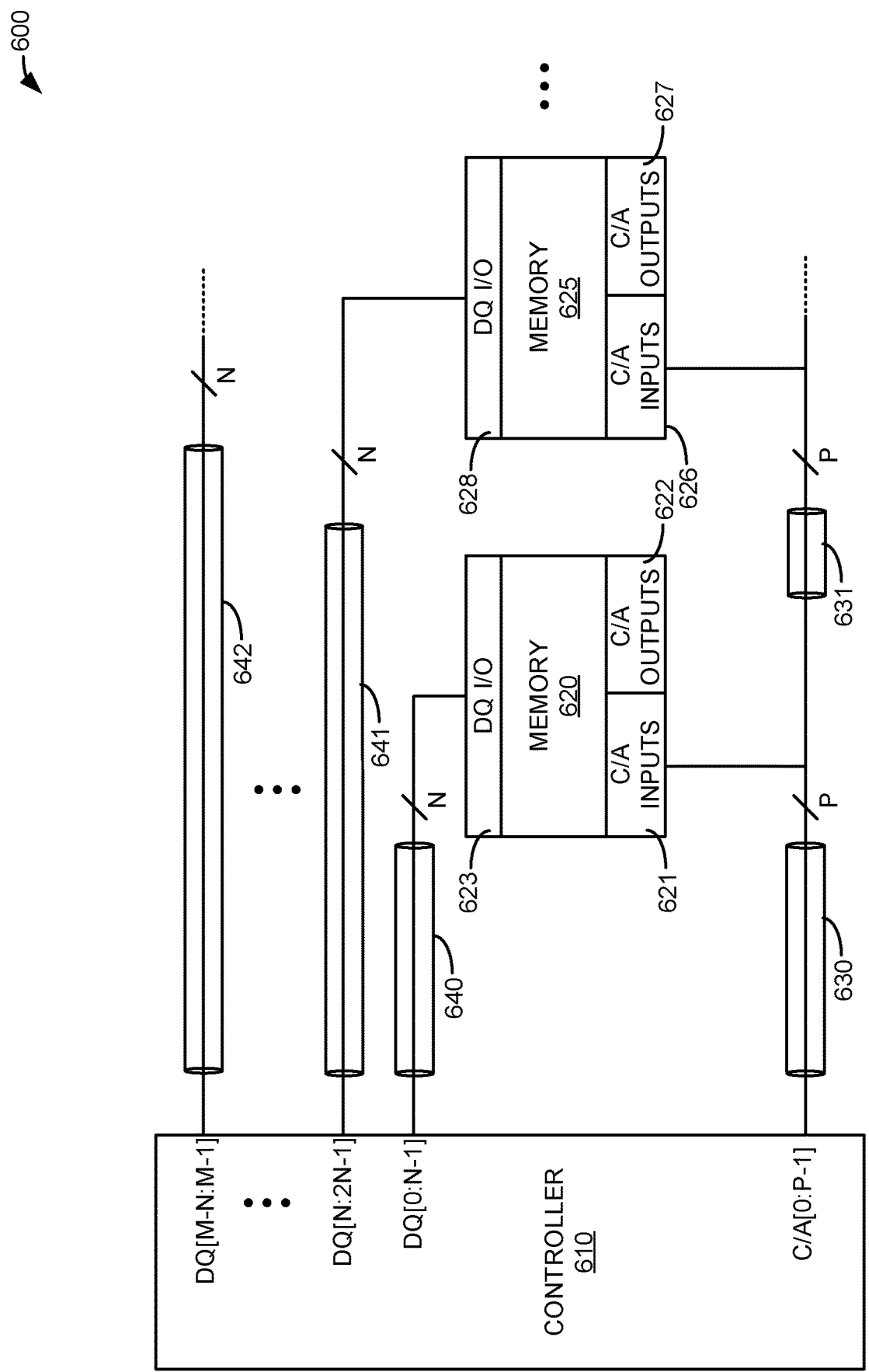
FIG. 6A is a block diagram of a memory system configuration.

FIG. 6A is a block diagram of a memory system configuration. In FIG. 6A memory controller 610 is configured to drive $C/A[0:P-1]$ signals in a point to multi-point configuration. Memory system 600 comprises controller 610, memory 620, memory 625, transmission lines 630, transmission lines 631, transmission lines 640, transmission lines 641, and transmission lines 642. Memory 620 includes C/A inputs 621, C/A outputs 622, and DQ I/O 623. Memory 625 includes C/A inputs 626, C/A outputs 627, and DQ I/O 628. DQ I/O's 623 and 628 may comprise a plurality of bidirectional receiver/transmitters that communicate data to/from memory 625 and memory 628, respectively.

First ends of transmission lines 630 are coupled to conductors $C/A[0:P-1]$ of controller 610. The second ends of transmission lines 630 are coupled to C/A inputs 621 of memory 620 and first ends of transmission lines 631. The second ends of transmission lines 631 are coupled to C/A inputs 626 of memory 625.

N number of DQ I/O conductors of memory 620 are coupled to DQ[0:N-1] I/O conductors of controller 610. N number of DQ I/O conductors of memory 620 are coupled to DQ[N:2N-1] I/O conductors of controller 610. Other groups of N DQ I/O conductors of other memories (not shown in FIG. 6A) may be coupled to other DQ I/O conductors of controller 610. For the sake of brevity, these are not shown in FIG. 6A, but are exemplified by transmission lines 642 coupled to DQ[M-N:M-1] I/O conductors of controller 610. In other words, controller 610 has a total of M DQ I/O conductors that are broken into groups of N. Each group of N is coupled via transmission lines 640-642 to a different memory 620, 625 in a point-to-point topology.

In an example, P may be approximately equal to 14, M may be approximately equal to 44, and N may be approximately equal to 22. This example illustrates a point-to-two-point C/A bus configuration with ×16 DQ wide memories. In an embodiment, controller 610 may have a second (or third, or fourth, etc.) set of $C/A[0:P-1]$ conductors and additional set or sets of DQ[0:M-1] conductors in order to connect to additional sets of memories in point-to-multipoint configurations.

In the configuration illustrated in FIG. 6A, the C/A conductors of controller 610 are coupled to the memories of memory system 600 in a point-to-multipoint configuration (a.k.a., a shared bus configuration). In this configuration, the C/A output conductors of memories 620 and 625 would not be used. Thus, driver circuitry connected to the C/A output conductors of memories 620 and 625 may be disabled by an internal mode and/or register value. This internal mode or register value may be set by controller 610.

Figure 6B:
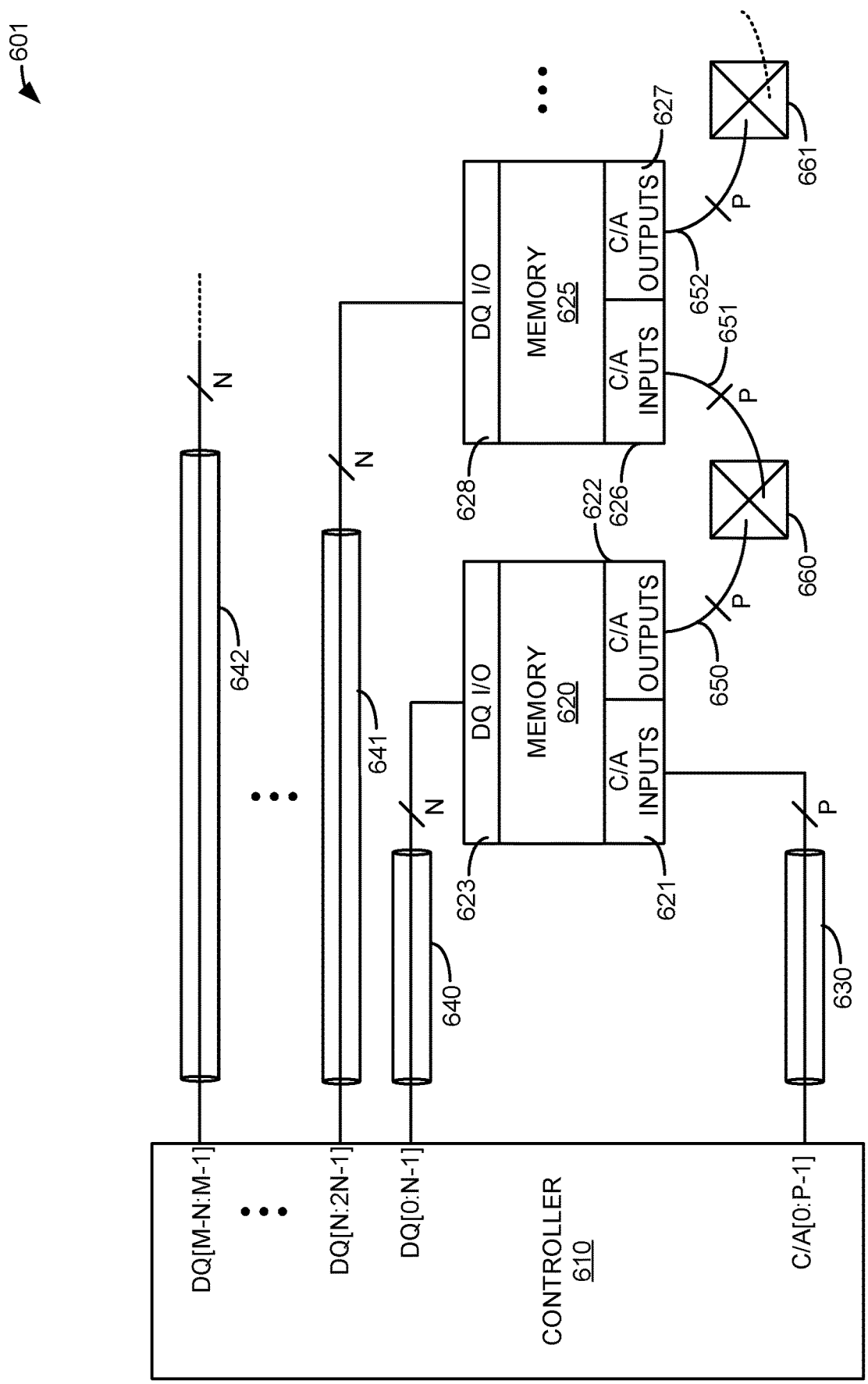
FIG. 6B is a block diagram of a memory system configuration.

FIG. 6B is a block diagram of a memory system configuration. In FIG. 6B memory controller 610, memory 620, and (optionally) memory 625 are configured to drive $C/A[0:P-1]$ signals in a series of point-to-point configurations linked by bonding wires and bonding pads. Memory system 601 comprises controller 610, memory 620, memory 625, transmission lines 630, transmission lines 640, transmission lines 641, transmission lines 642, bonding wires 650, bonding wires 651, bonding wires 652, bonding pad 660, and bonding pad 661. Memory 620 includes C/A inputs 621, C/A outputs 622, and DQ I/O 623. Memory 625 includes C/A inputs 626, C/A outputs 627, and DQ I/O 628.

First ends of transmission lines 630 are coupled to conductors $C/A[0:P-1]$ of controller 610. The second ends of transmission lines 630 are coupled to C/A inputs 621 of memory 620. C/A outputs 622 of memory 620 are coupled to C/A inputs 626 of memory 625 via bonding wires 650, bonding pad 660, and bonding wires 651. C/A outputs 627 of memory 625 may be coupled to C/A input conductors of one or more other memories (not shown in FIG. 6B) via bonding wires 652 and bonding pad 661. The signals received at C/A inputs 621 and/or 626 may be relayed to C/A outputs 622 and/or 626 in the manners or using circuitry described herein. Accordingly, for the sake of brevity, those discussions will not be repeated here.

N number of DQ I/O conductors of memory 620 are coupled to DQ[0:N-1] I/O conductors of controller 610. N number of DQ I/O conductors of memory 620 are coupled to DQ[N:2N-1] I/O conductors of controller 610. Other groups of N DQ I/O conductors of other memories (not shown in FIG. 6B) may be coupled to other DQ I/O conductors of controller 610. For the sake of brevity, these are not shown in FIG. 6B, but are exemplified by transmission lines 642 coupled to DQ[M-N:M−1] I/O conductors of controller 610. In other words, controller 610 has a total of M DQ I/O conductors that are broken into groups of N. Each group of N is coupled via transmission lines 640-642 to a different memory 620, 625.

In an example, P may be approximately equal to 16, M may be approximately equal to 44, and N may be approximately equal to 22. This example illustrates a relayed point-to-point C/A bus configuration with ×16 DQ wide memories. The increase in P from the example described in relation to FIG. 6A may include additional clock signals (e.g., CKI and CKQ) used in the relay of the C/A bus signals from C/A input conductors to C/A output conductors. In an embodiment, controller 610 may have a second (or third, or fourth, etc.) set of C/A[0:P−1] conductors and additional set or sets of DQ[0:M−1] conductors in order to connect to additional sets of memories in a chained point-to-point configuration.

Figure 6C:
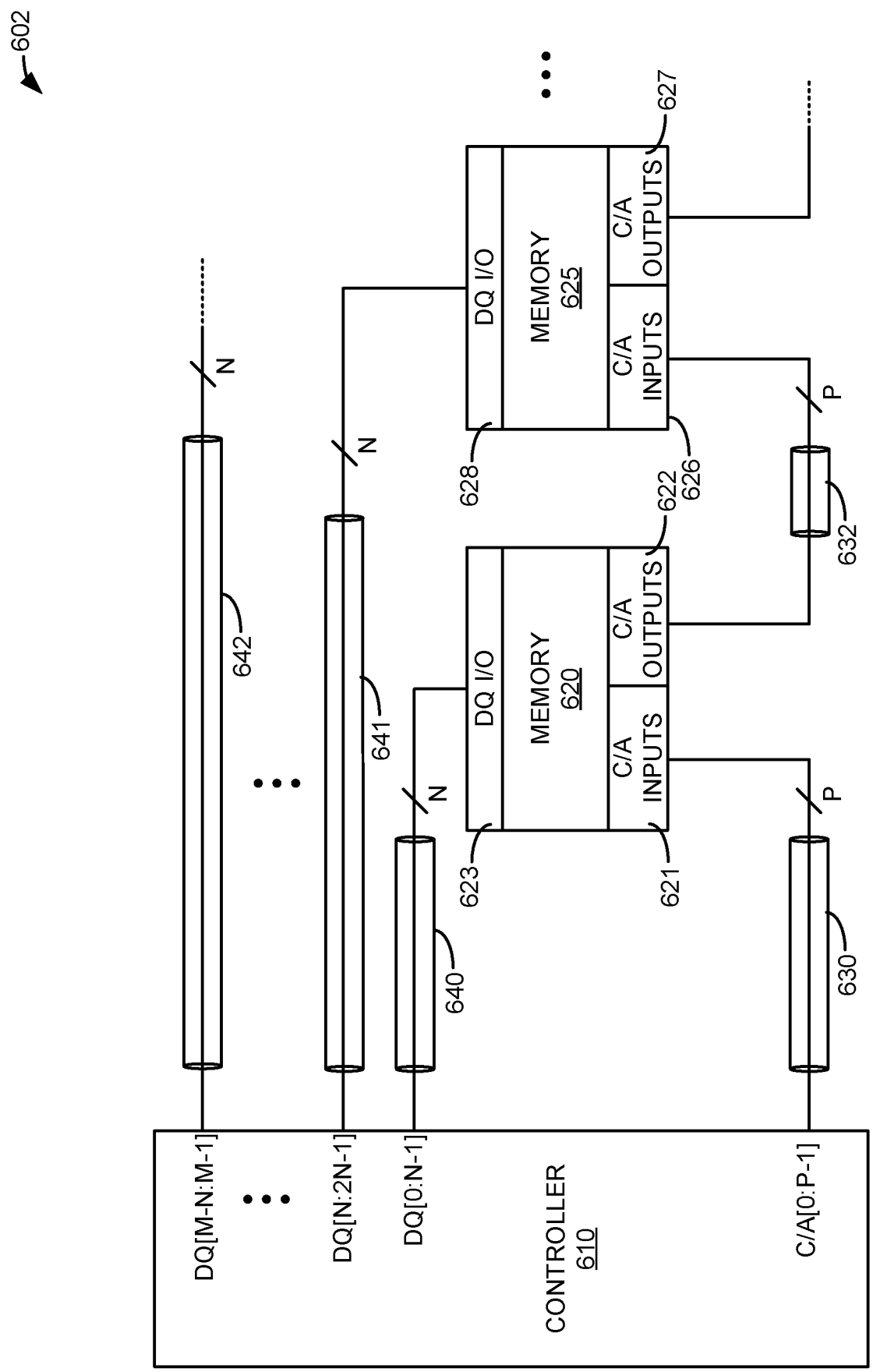
FIG. 6C is a block diagram of a memory system configuration.

FIG. 6C is a block diagram of a memory system configuration. In FIG. 6C memory controller 610, memory 620, and (optionally) memory 625 are configured to drive C/A[0:P−1] signals in a series of point-to-point configurations linked by at least one set of transmission lines. Memory system 602 comprises controller 610, memory 620, memory 625, transmission lines 630, transmission lines 632, transmission lines 640, transmission lines 641, and transmission lines 642. Memory 620 includes C/A inputs 621, C/A outputs 622, and DQ I/O 623. Memory 625 includes C/A inputs 626, C/A outputs 627, and DQ I/O 628.

First ends of transmission lines 630 are coupled to conductors C/A[0:P−1] of controller 610. The second ends of transmission lines 630 are coupled to C/A inputs 621 of memory 620. C/A outputs 622 of memory 620 are coupled to C/A inputs 626 of memory 625 via transmission lines 632. C/A outputs 627 of memory 625 may be coupled to C/A input conductors of one or more other memories (not shown in FIG. 6C) via bonding wires, bonding pads, and/or transmission lines (not shown in FIG. 6C). The signals received at C/A inputs 621 and/or 626 may be relayed to C/A outputs 622 and/or 626 in any of the manners or using any of circuitry described herein. Accordingly, for the sake of brevity, those discussions will not be repeated here.

N number of DQ I/O conductors of memory 620 are coupled to DQ[0:N−1] I/O conductors of controller 610. N number of DQ I/O conductors of memory 620 are coupled to DQ[N:2N−1] I/O conductors of controller 610. Other groups of N DQ I/O conductors of other memories (not shown in FIG. 6C) may be coupled to other DQ I/O conductors of controller 610. For the sake of brevity, these are not shown in FIG. 6C, but are exemplified by transmission lines 642 coupled to DQ[M-N:M−1] I/O conductors of controller 610. In other words, controller 610 has a total of M DQ I/O conductors that are broken into groups of N. Each group of N is coupled via transmission lines 640-642 to a different memory 620, 625.

In an example, P may be approximately equal to 16, M may be approximately equal to 44, and N may be approximately equal to 22. This example illustrates a relayed point-to-point C/A bus configuration with ×16 DQ wide memories. In an embodiment, reference to C/A[0:P−1] should be understood to include timing reference signals (e.g., CKI and CKQ). In an embodiment, controller 610 may have a second (or third, or fourth, etc.) set of C/A[0:P−1] conductors and additional set or sets of DQ[0:M−1] conductors in order to connect to additional sets of memories in a chained point-to-point configuration.

Figure 7A:
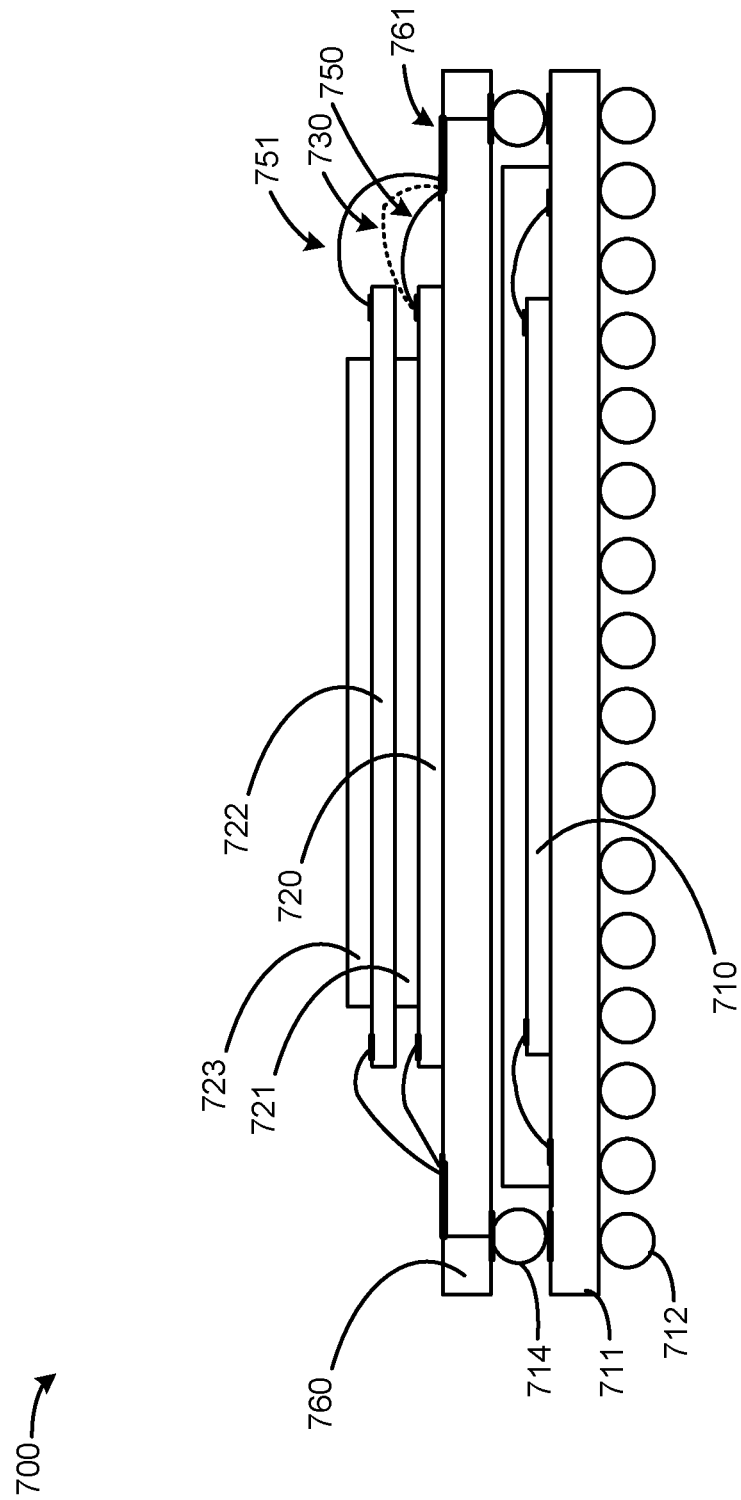
FIG. 7A is a side view of a memory system module.
Figure 7B:
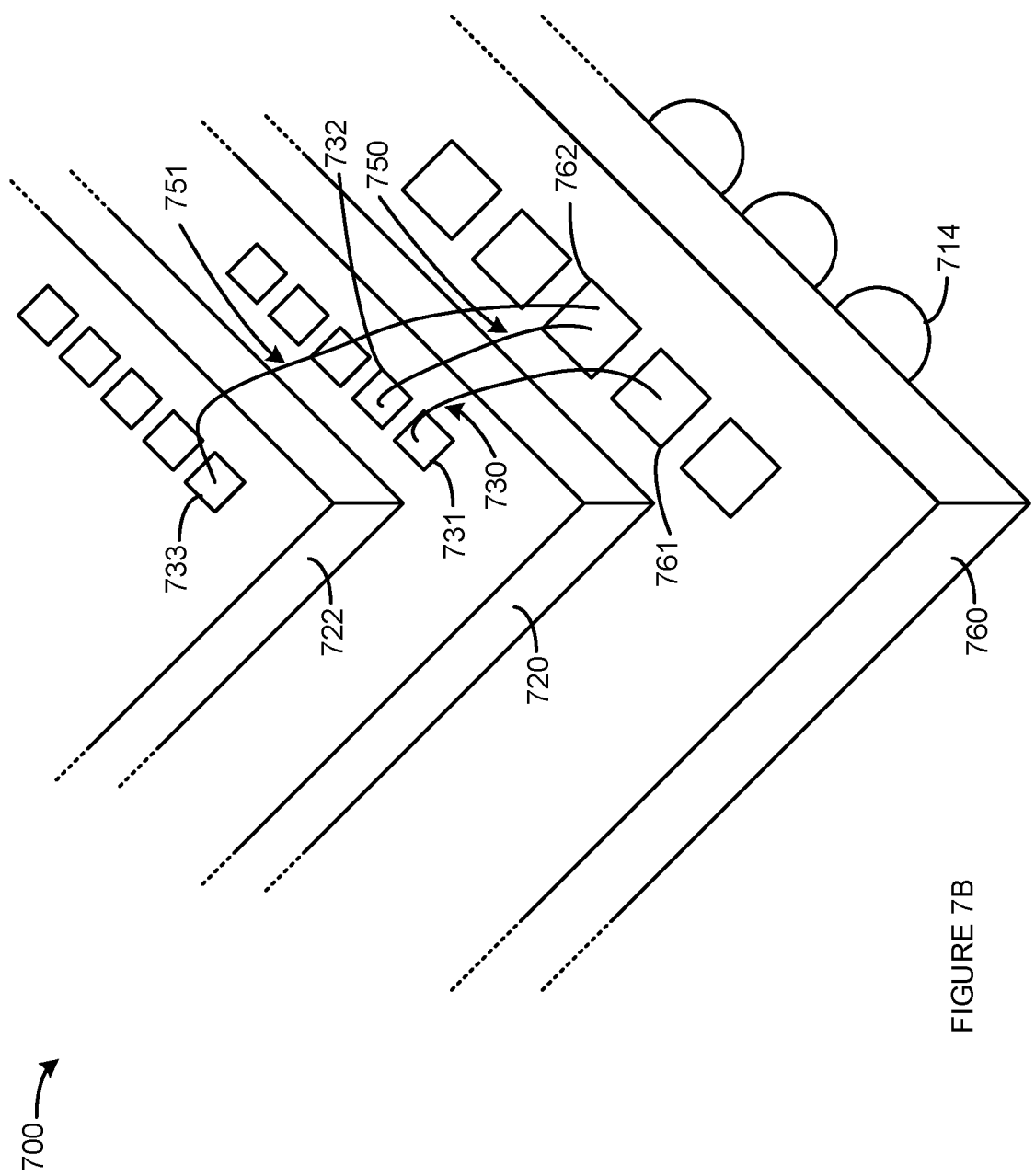
FIG. 7B is a perspective view of a memory system module.

FIG. 7A is a side view of a memory system module. FIG. 7B is a perspective view of a memory system module. In FIGS. 7A and 7B, memory system module 700 comprises memory controller 710, memory controller substrate 711, package balls 712, package balls 714, memory 720, memory 721, memory 722, memory 723, bonding wire 730, bonding pad 731, bonding pad 732, bonding pad 733, bonding wire 750, bonding wire 751, memory substrate 760, bonding pad 761, and bonding pad 762. Memory system module 700 may also be referred to as a package-on-package (POP) module. Memory system module 700 comprises two package portions. The first is memory controller 710 packaged on memory controller substrate 711. The second is memory 720-723 stack packaged on memory substrate 760. Thus, it should be understood that the second portion is packaged on the first portion to form a package-on-package type module.

Memory 720 is packaged on memory substrate 760. Memory 721 is packaged on memory 720. In an embodiment, memory 721 is rotated 90° relative to memory 720. This helps expose the bonding pads of memory 720 so bonding wires may be connected to memory 720. Memory 722 is packaged on memory 721. In an embodiment, memory 722 is rotated 90° relative to memory 721. This helps expose the bonding pads of memory 721 so bonding wires may be connected to memory 721. Memory 723 is packaged on memory 722. In an embodiment, memory 723 is rotated 90° relative to memory 722. This helps expose the bonding pads of memory 722 so bonding wires may be connected to memory 722.

Signals from memory controller 710 (e.g., DQ signals and/or C/A signals) to/from memory controller 710 may be communicated to/from memories 720-723 via solder balls 714, bonding pads on the memory substrate (e.g., bonding pads 761 and 762), and bonding wires (e.g., bonding wires bonding wire 750 and bonding wire 751). These signals may be communicated using a configuration like, or similar to, the configuration described in relation to FIG. 6B.

For example, a C/A signal from memory controller 710 may be conducted to memory substrate 760 via one of package balls 714. From that package ball 714, a conductor of memory substrate 760 may convey the C/A signal to a bonding pad 761. The C/A signal may then be conveyed to a bonding pad 731 of memory 720 via bonding wire 730. Bonding pad 731 of memory 720 may correspond or function like one of C/A inputs 621. Memory 720 may then relay the C/A signal to bonding pad 732. Bonding pad 732 of memory 720 may correspond or function like one of C/A outputs 622. Bonding wire 750 may then convey the C/A signal to bonding pad 762 of memory substrate 760. Bonding wire 751 may convey the C/A signal to bonding pad 733 of memory 722. Thus, bonding wire 750, bonding pad 762, and bonding wire 751 may correspond or function like a corresponding set of one of a bonding wire 650, a bonding pad 660, and a bonding wire 651.

Figure 8:
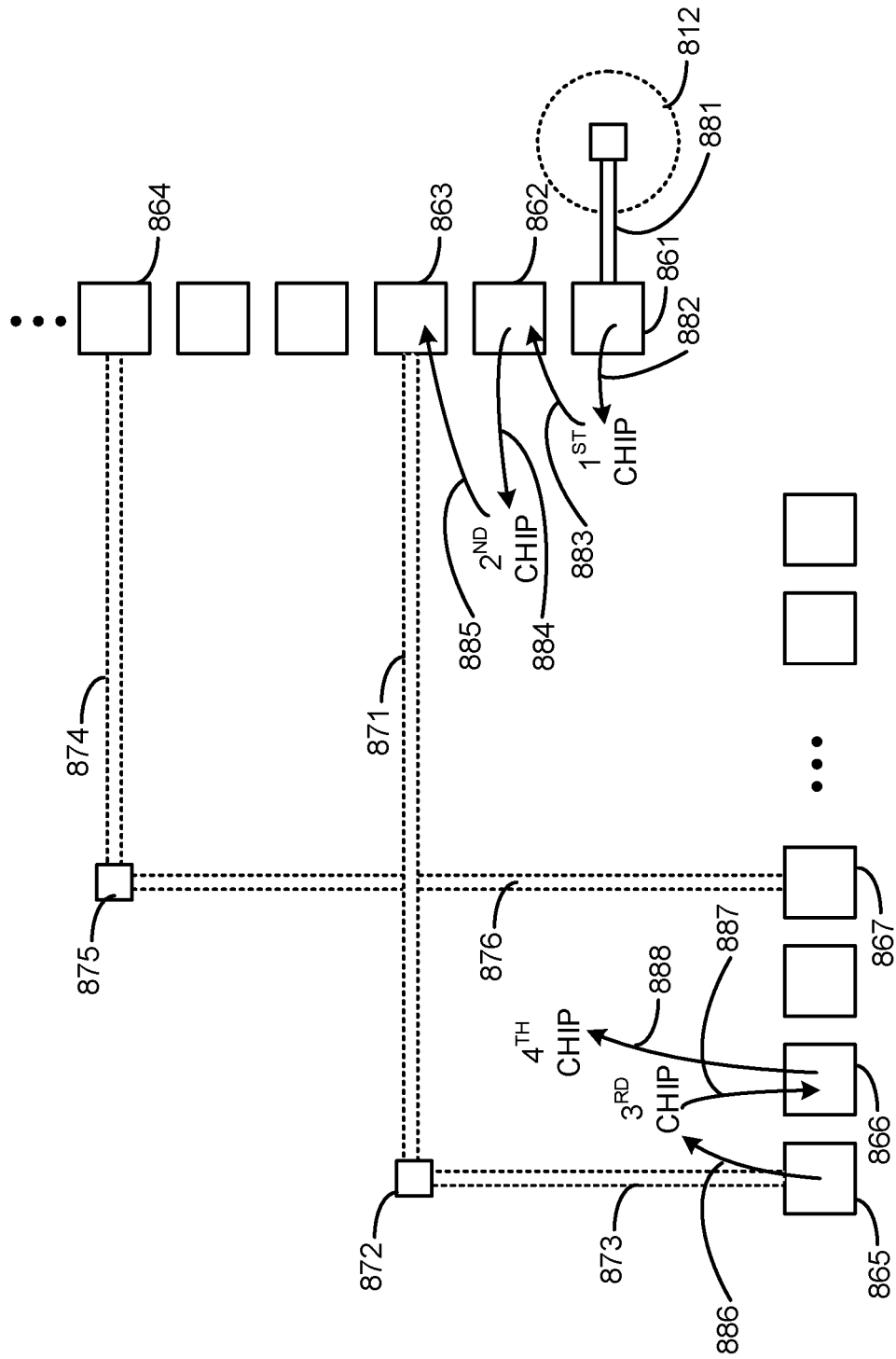
FIG. 8 is a top view illustration of a matched signal routing.

FIG. 8 is a top view illustration of a matched signal routing. FIG. 8 illustrates signal routing that may be used to couple four memories in a relayed point-to-point configuration. In FIG. 8, a signal (e.g., a C/A signal) is received on package ball 812. The signal is conducted to a bonding pad 861 by a conductor 881. A first bonding wire 882 then connects the signal to a $1^{st}$ chip (or memory). The first chip then relays the signal to a second bonding pad 862 via a second bonding wire 883. The signal is conducted from the second bonding pad 862 to a $2^{nd}$ chip via a third bonding wire 884. The second chip then relays the signal to a third bonding pad 863 via a fourth bonding wire 885. The third bonding pad 863 is connected to a fourth bonding pad 865 by way of transmission line 871, via 872, and transmission line 873. A fifth bonding wire 886 then connects the signal from bonding pad 865 to a 3rd chip. The third chip then relays the signal to a fifth bonding pad 866 via a sixth bonding wire 887. The signal is conducted from the fifth bonding pad 866 to a $4^{th}$ chip via a seventh bonding wire 888. In an embodiment, the first chip corresponds to the bottom chip (i.e., memory 720) and the second chip corresponds to the third from the bottom chip (i.e., memory 722) in a memory stack. Likewise, the third chip corresponds to the second from the bottom chip (i.e., memory 721) and the fourth chip corresponds to the top chip (i.e., memory 722) in a memory stack.

As discussed previously, the third bonding pad 863 is connected to a fourth bonding pad 865 by way of transmission line 871, via 872, and transmission line 873. Also shown in FIG. 8 is bonding pad 864 connected to bonding pad 867 by way of transmission line 874, via 875, and transmission line 876. It should be understood that by equalizing the total length of transmission lines 871 and 872 to the total length of transmission lines 874 and 876, the signal routing between bonding pads 864 and 867 will match the signal routing between bonding pads 863 and 865.

Figure 9:
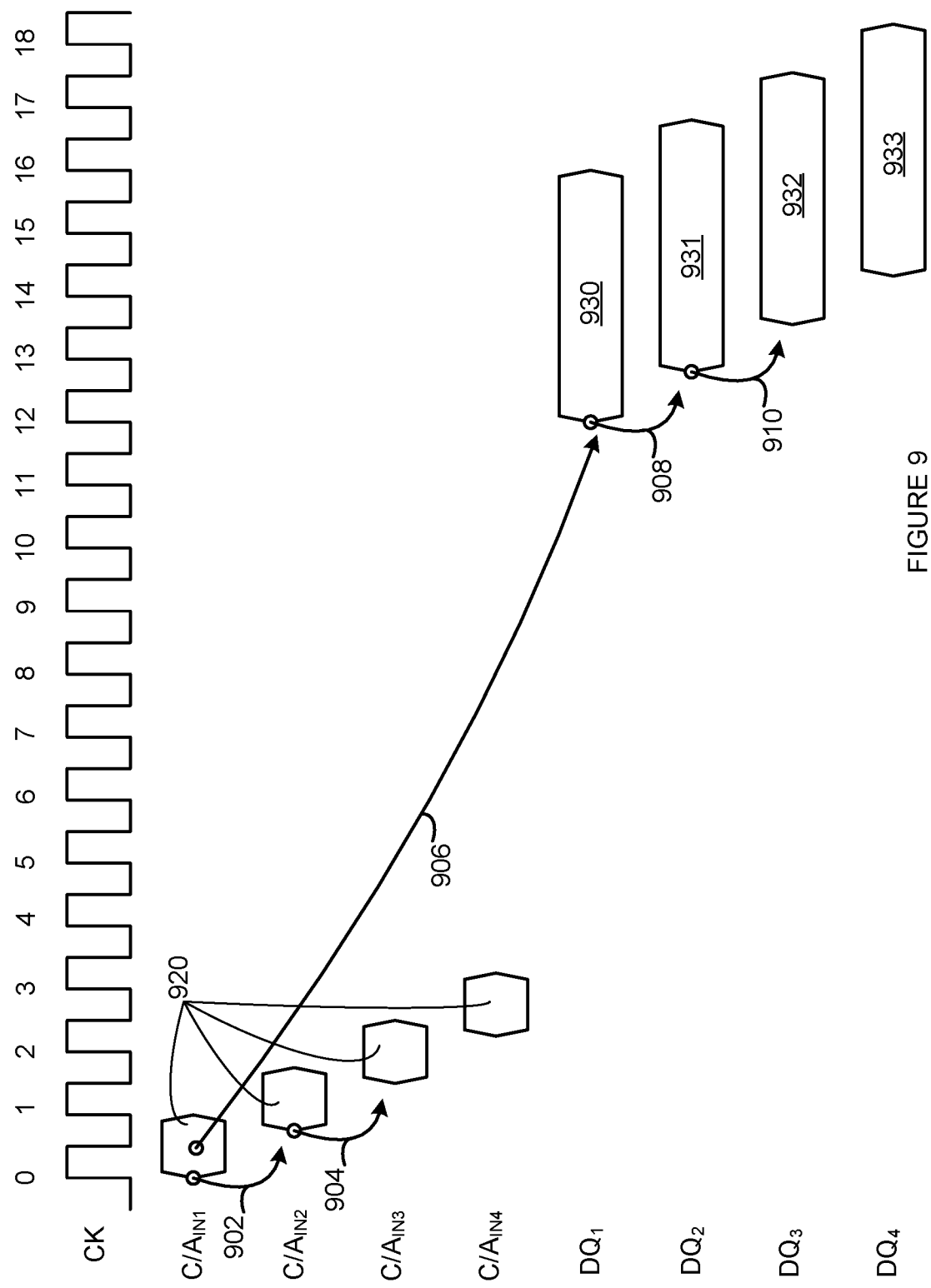
FIG. 9 is a timing diagram illustrating the operation of a memory system configuration.

FIG. 9 is a timing diagram illustrating the operation of a memory system configuration. The operation illustrated in FIG. 9 involves the same command and address being sent to each device in a relayed chain of point-to-point connected memories. In FIG. 9, a command 920 on the C/A bus is received by a first memory. For example, memory 620 may receive, from controller 610, a command 920 on the C/A bus via C/A inputs 621. The first memory may relay the received command 920 to a second memory. For example, memory 620 may relay the received command 920 to memory 625 using C/A outputs 622. The process and/or circuitry used to relay the received command 920 may, as described herein, interject a delay from the time the command 920 is received until the time it is driven and subsequently received by the second memory. This is illustrated by arrow 902. In an embodiment, this delay is three-fourths (¾) of a clock cycle (where 1 clock cycle communicates two commands/addresses on the C/A bus).

The second memory may relay the received command 920 to a third memory. For example, memory 625 may relay the received command 920 to a next memory using C/A output conductors 627. The process and/or circuitry used to relay the received command 920 may, as describe previously, interject a delay from the time the command 920 is received until the time the command 920 is driven and subsequently received by the next memory. This is illustrated by arrow 904. In an embodiment, this delay is the same as the delay between the first memory receiving the command 920 and the second memory driving the command 920. As described previously, in an embodiment, this is three-fourths (¾) of a clock cycle.

A period of time (or number of clock cycles) passes from when the command 920 was received by the first memory and a response 930 is made (or write data sent) on the DQ signal lines (e.g. $DQ_1$ in FIG. 9) of the first memory. This is illustrated by arrow 906. Typically, the period of time (or number of clock cycles) that pass from when the command 920 is received by the second memory (and any subsequent memories) and a response 930-933 is made (or write data sent) on the DQ signal lines is the same as the first memory. Thus, the response 931 made (or write data sent) on the DQ lines of the second memory lags the response 930 made (or write data sent) by the same delay as was between the first memory receiving the command 920 and the second memory driving the command 920. This is illustrated by arrow 908. Likewise, the response 932 made (or write data sent) on the DQ lines of the next memory lags the response 931 made (or write data sent) by the same delay as was between the second memory receiving the command 920 and the next memory driving the command 920. This is illustrated by arrow 910. Likewise, response 933 lags response 932.

Figure 10:
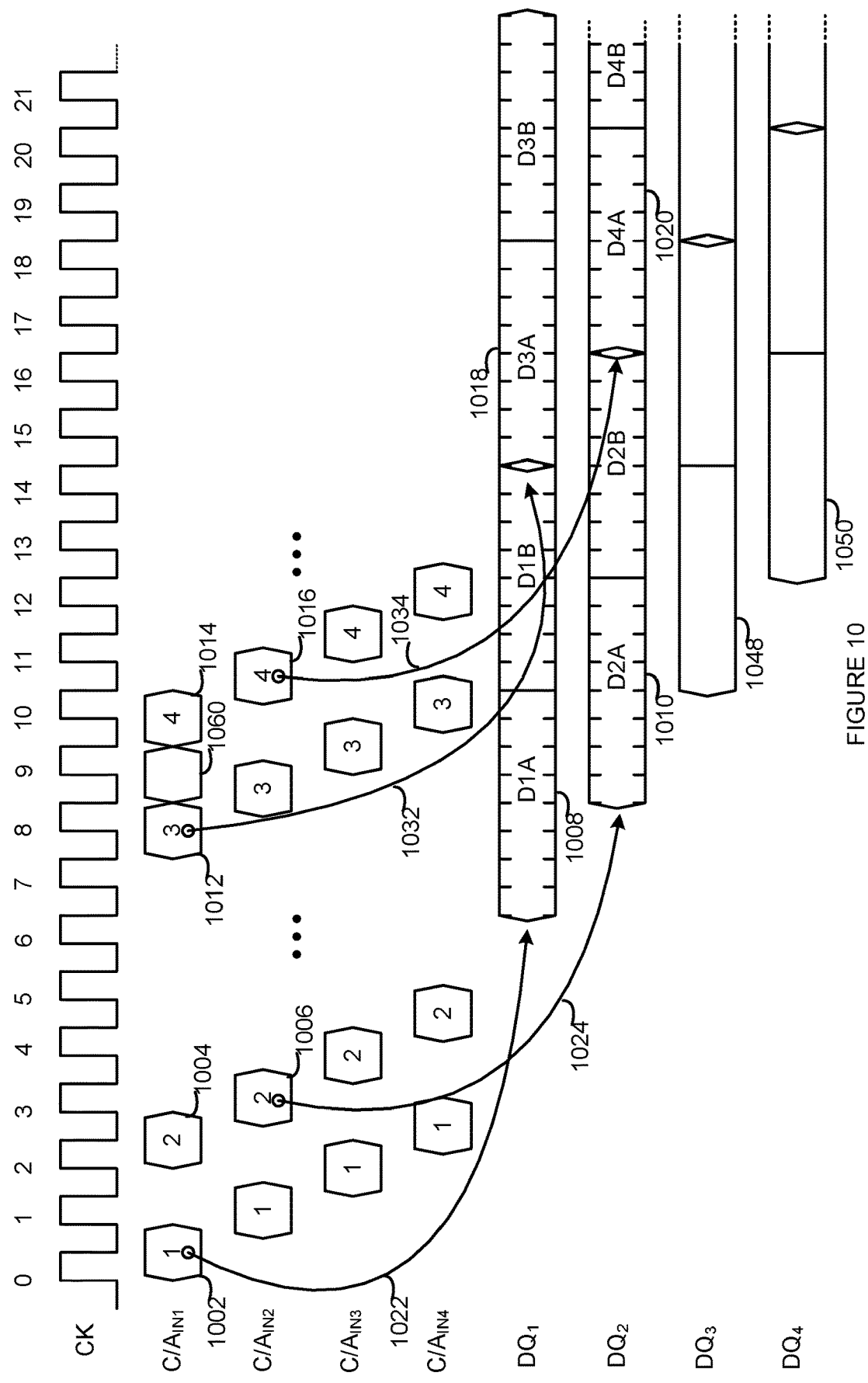
FIG. 10 is a timing diagram illustrating the threaded operation of a memory system configuration.

FIG. 10 is a timing diagram illustrating the threaded operation of a memory system configuration. The operation illustrated in FIG. 10 involves the same command but a different address being sent to each device in a relayed chain of point-to-point connected memories. In FIG. 10, a first command and address on the C/A bus is received by a first memory. For example, memory 620 may receive, from controller 610, a first command and address on the C/A bus via C/A inputs 621. This first command is labeled "1" in FIG. 10. The first memory may relay the received first command and address to a second memory. For example, memory 620 may relay the received first command and address to memory 625 using C/A outputs 622.

The process and/or circuitry used to relay the received command may, as described previously, interject a delay from the time the command is received until the time it is driven and subsequently received by the second memory. That time delay may be interjected by each subsequent memory in the point-to-point chain. This is illustrated in FIG. 10 by the arrival times shown as successively later for each successive C/A input conductors for each command (each command is labeled 1, 2, 3, or 4 to distinguish them.)

In an embodiment, the address or command may specify that the first memory is to respond to this command. This is illustrated in FIG. 10 by arrow 1022 running from the command and address 1002 received by the first chip to the response 1008 of D1A and D1B data. The address or command may also specify that the other memories are not to respond to this command. This is illustrated in FIG. 10 by a lack of arrows running from any of the command and addresses labeled "1" as received at $C/A_{IN2}$, $C/A_{IN3}$, and $C/A_{IN4}$ to any response on any of $DQ_2$, $DQ_3$, or $DQ_4$.

A second command and address on the C/A bus is received by a first memory. For example, memory 620 may receive, from controller 610, a second command and address on the C/A bus via C/A inputs 621. The first memory may relay the received first command and address to the chain of subsequent memories.

The second address or command may specify that the first memory is not to respond to this command, but the second memory is to respond. This is illustrated in FIG. 10 by arrow 1024 running from the command and address 1006 received by the second chip to the response 1010 of D2A and D2B data. The address or command may also specify that the other memories are not to respond to this command. This is illustrated, at least in part, in FIG. 10 by a lack of arrows running from any of the command and addresses labeled "2" (e.g., command and address 1004) as received at $C/A_{IN1}$, $C/A_{IN3}$, and $C/A_{IN4}$ to any response on any of $DQ_1$, $DQ_3$, or $DQ_4$. It should be understood that the address in the second command need not be the same address as the first command. In this way, reads from (or writes to) the first memory in the chain may be made independent of the address of the read from (or write to) the second memory in the chain.

After a period of time sufficient for the first memory to provide a response on $DQ_1$, a third command may be sent to the first memory. This is illustrated by command and address 1012 (labeled "3"). As described previously, the address or command may specify that the first memory is to respond to this command. This is illustrated in FIG. 10 by arrow 1032 running from the command and address 1012 received by the first chip to the response 1018 of D3A and D3B data. The address or command may also specify that the other memories are not to respond to this command. This is illustrated in FIG. 10 by a lack of arrows running from any of the command and addresses labeled "3" as received at C/A$_{IN2}$, C/A$_{IN3}$, and C/A$_{IN4}$ to any response on any of DQ$_2$, DQ$_3$, or DQ$_4$.

After a period of time sufficient for the second memory to provide a response on DQ$_2$, to the command and address labeled "2", a fourth command may be sent to the first memory. For example, memory 620 may receive, from controller 610, a fourth command and address on the C/A bus via C/A input conductors 621. The first memory may relay the received fourth command and address to the chain of subsequent memories.

The fourth address or command may specify that the first memory is not to respond to this command, but the second memory is to respond. This is illustrated in FIG. 10 by arrow 1034 running from the command and address 1016 received by the second chip to the response 1020 of D4A and D4B data. The address or command may also specify that the other memories are not to respond to this command. This is illustrated, at least in part, in FIG. 10 by a lack of arrows running from any of the command and addresses labeled "4" (e.g., command and address 1014) as received at C/A$_{IN1}$, C/A$_{IN3}$, and C/A$_{IN4}$ to any response on any of DQ$_1$, DQ$_3$, or DQ$_4$.

It should be noted that if the right amount of time (or clock cycles) are selected between issuing the first and third command/address pairs (or the second and fourth command address pairs), the DQ lines responding to that command will not have any unused cycles between commands. This is illustrated in FIG. 10 by the continuity of data between response 1008 and 1018 (and likewise, the continuity of data between 1010 and 1020). It should further be noted that in order to instruct only a single one of the memories in the point-to-point chain, a method of individually addressing commands to individual memories may be implemented. This may be done by encoding chip select signals into the command. In order to reduce the number of signal lines dedicated to addressing a particular memory in the point-to-point chain, chip select signals may be encoded in a plurality of bits as opposed to using an unencoded "one-hot" chip select scheme. It should also be understood that in the time between command #2 and command #3, other commands may be issued to the third and fourth memory devices. These commands may elicit responses (or require responses). This is illustrated in FIG. 10 by responses 1048 and 1050.

Figure 11:
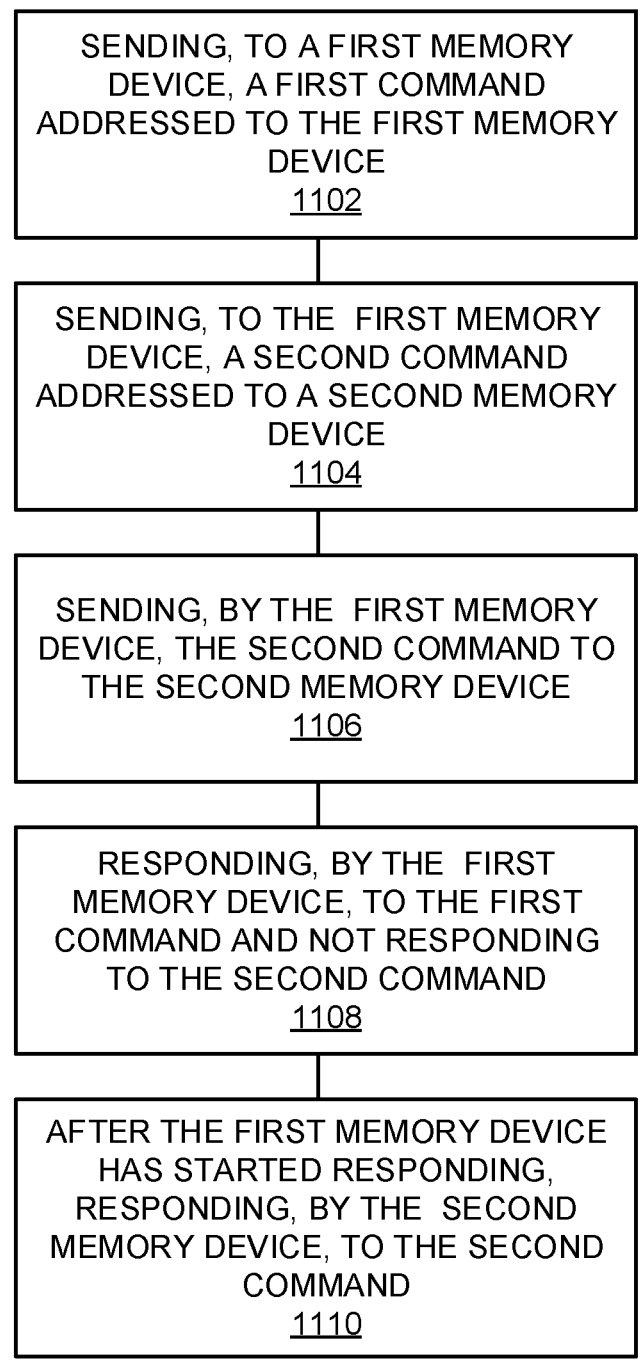
FIG. 11 is a flowchart illustrating the operation of a memory system configuration.

FIG. 11 is a flowchart illustrating the operation of a memory system configuration. The steps illustrated in FIG. 11 may be performed by, for example, one or more elements of memory system 200, memory system 600, memory system 601, memory system 602, or memory system module 700. A first command addressed to a first memory device is sent to the first memory device (1102). For example, memory controller 201 may send a first command addressed to memory 202 to memory 202. A second command addressed to a second memory device is sent to the first memory device (1104). For example, a second command, addressed to memory 203 by means of a plurality of bits representing encoded chip select field, may be sent to memory 202.

The second command is sent by the first memory device to the second memory device (1106). For example, memory 202 may send the second command to memory 203. The first memory device responds to the first command and not the second command (1108). For example, memory 202 may respond to the first command because the first command was addressed to memory 202. Memory 202 may not respond to the second command because the second command was addressed to memory 203 and not memory 202. After the first memory device has started responding to the first command, the second memory device starts responding to the second command (1110). For example, after memory 202 has started responding to the first command, memory 203 may start responding to the second command. An example of this process of subsequent responses to subsequent commands addressed to different memory devices was illustrated in FIG. 10.

Figure 12:
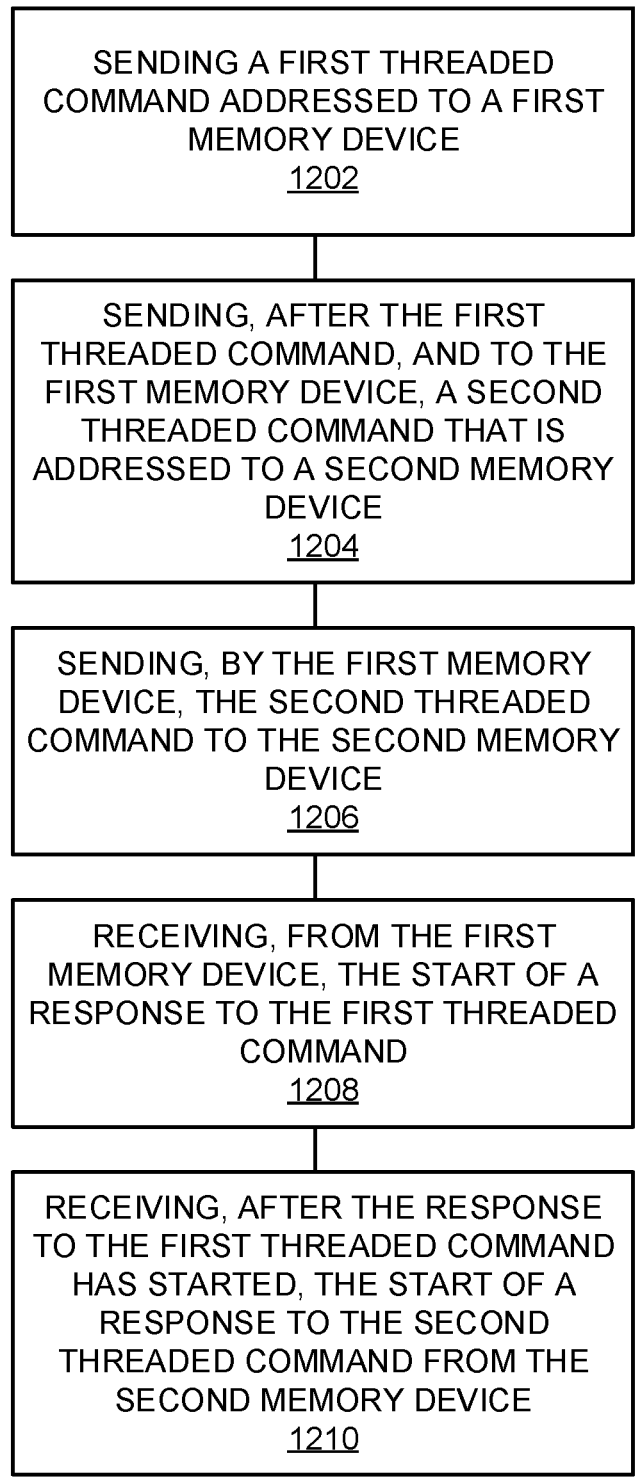
FIG. 12 is a flowchart illustrating the threaded operation of a memory system configuration.

FIG. 12 is a flowchart illustrating the threaded operation of a memory system configuration. The steps illustrated in FIG. 12 may be performed by, for example, one or more elements of memory system 200, memory system 600, memory system 601, memory system 602, or memory system module 700.

A first threaded command addressed to a first memory device is sent (1202). For example, controller 610 may send a first threaded command addressed to memory 620 to memory 620. After the first threaded command is sent, a second threaded command that is addressed to a second memory device is sent to the first memory device (1204). For example, after controller 610 sends a first threaded command addressed to memory 620 to memory 620, controller 610 may send a second threaded command that is addressed to memory 625 to memory 620.

The second threaded command is sent, by the first memory device, to the second memory device (1206). For example, memory 620 may send the second threaded command to memory 625. The start of a response to the first threaded command is received from the first memory device (1208). For example, controller 610 may receive, on DQ[0:N−1] I/O conductors, the start of a response to the first threaded command. After the response to the first threaded command has started, the start of a response to the second threaded command is received from the second memory device (1210). For example, controller 610 may receive, on DQ[N:2N−1] I/O conductors, a response to the second threaded command from memory 625 after the response by memory 620 on DQ[0:N−1] I/O conductors to the first command has started (or finished).

The systems and devices described above may be implemented in computer systems, or stored by computer systems. The systems described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of memory configuration 100, memory configuration 101, memory system 200, memory system 400, memory system 600, memory system 601, memory system 602, or memory system module 700, and their components. These software descriptions may be: behavioral, register transfer, logic component, transistor, and layout geometry-level descriptions. Moreover, the software descriptions may be stored on non-transitory storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 13:
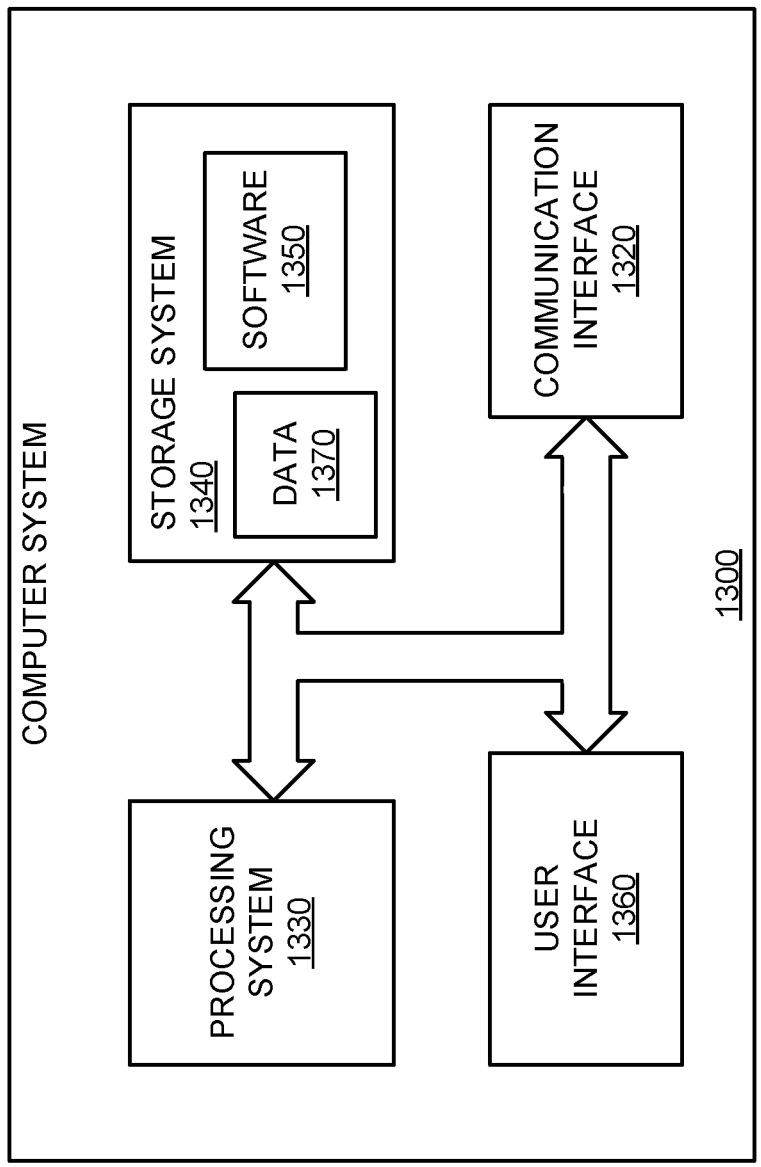
FIG. 13 is a block diagram of a computer system.

FIG. 13 illustrates a block diagram of a computer system. Computer system 1300 includes communication interface 1320, processing system 1330, storage system 1340, and user interface 1360. Processing system 1330 is operatively coupled to storage system 1340. Storage system 1340 stores software 1350 and data 1370. Computer system 1300 may include one or more of memory configuration 100, memory configuration 101, memory system 200, memory system 400, memory system 600, memory system 601, memory system 602, or memory system module 700. Processing system 1330 is operatively coupled to communication interface 1320 and user interface 1360. Computer system 1300 may comprise a programmed general-purpose computer. Computer system 1300 may include a microprocessor. Computer system 1300 may comprise programmable or special purpose circuitry. Computer system 1300 may be distributed among multiple devices, processors, storage, and/or interfaces that together comprise elements 1320-1370.

Communication interface 1320 may comprise a network interface, modem, port, bus, link, transceiver, or other communication device. Communication interface 1320 may be distributed among multiple communication devices. Processing system 1330 may comprise a microprocessor, microcontroller, logic circuit, or other processing device. Processing system 1330 may be distributed among multiple processing devices. User interface 1360 may comprise a keyboard, mouse, voice recognition interface, microphone and speakers, graphical display, touch screen, or other type of user interface device. User interface 1360 may be distributed among multiple interface devices. Storage system 1340 may comprise a disk, tape, integrated circuit, RAM, ROM, EEPROM, flash memory, network storage, server, or other memory function. Storage system 1340 may include computer readable medium. Storage system 1340 may be distributed among multiple memory devices.

Processing system 1330 retrieves and executes software 1350 from storage system 1340. Processing system 1330 may retrieve and store data 1370. Processing system 1330 may also retrieve and store data via communication interface 1320. Processing system 1330 may create or modify software 1350 or data 1370 to achieve a tangible result. Processing system 1330 may control communication interface 1320 or user interface 1360 to achieve a tangible result. Processing system may retrieve and execute remotely stored software via communication interface 1320.

Software 1350 and remotely stored software may comprise an operating system, utilities, drivers, networking software, and other software typically executed by a computer system. Software 1350 may comprise an application program, applet, firmware, or other form of machine-readable processing instructions typically executed by a computer system. When executed by processing system 1330, software 1350 or remotely stored software may direct computer system 1300 to operate.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A memory controller, comprising:
a bidirectional data interface to be coupled to a bidirectional data bus having a set of signals;
a command interface to set a first settable mode of a first memory device and to set a second settable mode of a second memory device, the first settable mode being stored using a first value in a first mode register and configuring the first memory device to use a first proper subset of the set of signals to respond to commands accessing a first memory core and to use the first proper subset of the set of signals to receive write data, the second settable mode being stored using a second value in a second mode register and configuring the second memory device to use a second proper subset of the set of signals to respond to commands accessing a second memory core and to use the second proper subset of the set of signals to receive write data, wherein the first proper subset and the second proper subset are disjoint; and,
the bidirectional data interface to receive, from the bidirectional data bus, responses to commands sent via the command interface, the bidirectional data interface to transmit write data to a plurality of memory devices via the bidirectional data bus.

2. The memory controller of claim 1, wherein the command interface is to further configure the first memory device to relay commands to the second memory device.

3. The memory controller of claim 2, wherein the command interface is to send a first command to the first memory device to be performed by the first memory device and is to send a second command to the first memory device to be relayed to the second memory device for performance by the second memory device.

4. The memory controller of claim 3, wherein the bidirectional data interface receives a first response to the first command via the bidirectional data bus before the bidirectional data interface receives a second response to the second command via the bidirectional data bus.

5. The memory controller of claim 4, wherein the first memory device is configured to interject a delay between receiving the second command and relaying the second command.

6. The memory controller of claim 5, wherein the delay corresponds to an amount of time between the bidirectional data interface receiving the first response to the first command via the bidirectional data bus and the bidirectional data interface receiving the second response to the second command via the bidirectional data bus.

7. A memory controller, comprising:
a first plurality of conductors to couple to a bidirectional data bus having a set of signals, a first subset of the set of signals being used by a first memory device based on a first settable mode of the first memory device and a second subset of the set of signals being used by a second memory device based on a second settable mode of the second memory device, the first settable mode of the first memory device and the second settable mode of the second memory device to be set by the memory controller, the first subset and the second subset being disjoint; and, a second plurality of conductors to couple to a first bus, that is separate from the bidirectional data bus, to send a first threaded command and at least a first address to the first memory device and, after the first threaded command is sent, to send a second threaded command and at least a second address to the first memory device, the first threaded command to be performed by the first memory device, the first memory device including a third plurality of conductors to couple to a second bus to send the second threaded command and the at least second address from the first memory device to the second memory device in response to at least a third settable mode of the first memory device, the third settable mode of the first memory device to be set by the memory controller.

8. The memory controller of claim 7, wherein the first plurality of conductors receives a first response to the first threaded command via the first subset of the set of signals.

9. The memory controller of claim 8, wherein the first plurality of conductors receives a second response to the second threaded command via the second subset of the set of signals after the first plurality of conductors receives the first response to the first threaded command via the first subset of the set of signals.

10. The memory controller of claim 7, wherein the second memory device, in response to at least a fourth settable mode of the second memory device, sends a third threaded command and at least a third address.

11. The memory controller of claim 10, wherein a first response to the first threaded command is received via the first subset of the set of signals before a second response to the second threaded command is received via the second subset of the set of signals.

12. The memory controller of claim 10, wherein a third response to the third threaded command is received after the second response to the second threaded command is received via the second subset of the set of signals.

13. The memory controller of claim 12, wherein the first memory device interjects a delay between receiving and sending the second threaded command.

14. A method of operating a memory controller, comprising:
setting, by the memory controller, a first settable mode of a first memory device that configures the first memory device to use a first subset of signals of a bidirectional data bus to respond to a first command;
setting, by the memory controller, a second settable mode of the first memory device that configures the first memory device to relay a second command to a second memory device; and,
setting, by the memory controller, a third settable mode of the second memory device that configures the second memory device to use a second subset of signals of the bidirectional data bus to respond to the second command, the first subset of signals and the second subset of signals to be disjoint.

15. The method of claim 14, further comprising:
sending the first command to the first memory device; and,
receiving a first response to the first command via the first subset of signals of the bidirectional data bus and not receiving a response to the first command via the second subset of signals of the bus.

16. The method of claim 15, further comprising:
sending, after sending the first command, the second command to the first memory device; and,
receiving, after receiving the first response, a second response to the second command via the second subset of signals of the bidirectional data bus.

17. The method of claim 16, wherein the first memory device is stack packaged with the second memory device.

18. The method of claim 16, wherein the first memory device is configured to delay sending the second command to the second memory device after receiving the second command.

19. The method of claim 18, further comprising:
setting, by the memory controller, a fourth settable mode of the second memory device that configures the second memory device to relay a third command to a third memory device.

20. The method of claim 19, further comprising:
setting, by the memory controller, a fifth settable mode of the third memory device that configures the third memory device to use a third subset of signals of the bidirectional data bus to respond to the third command, the first subset, the second subset, and the third subset to be disjoint.

* * * * *